(12) United States Patent
Ban et al.

(10) Patent No.: US 11,508,951 B2
(45) Date of Patent: Nov. 22, 2022

(54) SOLID-STATE ENERGY STORAGE DEVICES AND METHODS OF MAKING THE SAME

(71) Applicants: Alliance for Sustainable Energy, LLC, Golden, CO (US); The Regents of the University of Colorado, a body corporate, Denver, CO (US)

(72) Inventors: Chunmei Ban, Golden, CO (US); Simon Elnicki Hafner, Palo Alto, CA (US); Se-Hee Lee, Superior, CO (US)

(73) Assignees: Alliance for Sustainable Energy, LLC, Golden, CO (US); The Regents of the University of Colorado, a Body Corporate, Denver, CO (US)

( * ) Notice: Subject to any disclaimer, the term of this patent is extended or adjusted under 35 U.S.C. 154(b) by 250 days.

(21) Appl. No.: 16/682,064

(22) Filed: Nov. 13, 2019

(65) Prior Publication Data
US 2020/0243834 A1 Jul. 30, 2020

Related U.S. Application Data

(60) Provisional application No. 62/760,166, filed on Nov. 13, 2018.

(51) Int. Cl.
*H01M 10/0562* (2010.01)
*H01M 10/0525* (2010.01)
(Continued)

(52) U.S. Cl.
CPC ......... *H01M 4/0419* (2013.01); *H01M 4/043* (2013.01); *H01M 4/0404* (2013.01);
(Continued)

(58) Field of Classification Search
None
See application file for complete search history.

(56) References Cited

U.S. PATENT DOCUMENTS

| 5,411,592 | A | * | 5/1995 | Ovshinsky | ............ | H01M 6/188 |
| | | | | | | 118/325 |
| 2014/0051013 | A1 | * | 2/2014 | Elabd | ................... | D01D 5/0061 |
| | | | | | | 429/530 |

(Continued)

OTHER PUBLICATIONS

Chen, C.H. et al., "Electrostatic spray deposition of thin layers of cathode materials for lithium battery," Solid State Ionics, 86-88, 1996, pp. 1301-1306.
(Continued)

*Primary Examiner* — Cynthia H Kelly
*Assistant Examiner* — Julian Anthony
(74) *Attorney, Agent, or Firm* — Michael A. McIntyre

(57) ABSTRACT

An aspect of the present disclosure is a system that includes a first deposition system that includes a first cylinder having a first outer surface configured to hold a first substrate, a first spray nozzle configured to receive at least a first fluid, and a first fiber nozzle configured to receive at least a second fluid, where the first spray nozzle is configured to operate at a first voltage, the first fiber nozzle is configured to operate at a second voltage, the first cylinder is configured to be electrically connected to ground, the first spray nozzle is configured to apply onto the substrate a first plurality of at least one of particles or droplets from the first fluid, the first fiber nozzle is configured to apply onto the substrate a first fiber from the second fluid, and the first plurality of particles or droplets and the first fiber combine to form a first composite layer on the substrate.

18 Claims, 21 Drawing Sheets

(51) Int. Cl.
H01M 4/04 (2006.01)
H01M 4/131 (2010.01)
H01M 4/1391 (2010.01)

(52) U.S. Cl.
CPC ....... *H01M 4/0407* (2013.01); *H01M 4/0409* (2013.01); *H01M 4/131* (2013.01); *H01M 4/1391* (2013.01); *H01M 10/0525* (2013.01)

(56) References Cited

U.S. PATENT DOCUMENTS

| | | | |
|---|---|---|---|
| 2014/0141152 A1 | 5/2014 | Sostek et al. | |
| 2015/0372286 A1* | 12/2015 | Bolandi | H01M 4/0471 427/482 |
| 2016/0380296 A1 | 12/2016 | Pintauro et al. | |
| 2018/0175366 A1* | 6/2018 | Zheng | H01M 4/1395 |

OTHER PUBLICATIONS

Jaworek, A. et al., "Electrospraying route to nanotechnology: An overview," Journal of Electrostatics, vol. 66, 2008, pp. 197-219.

Kim, I. et al., "Cross-Linked Poly(vinylidene fluoride-co-hexafluoropropene) (PVDF-co-HFP) Gel Polymer Electrolyte for Flexible Li-Ion Battery Integrated with Organic Light Emitting Diode (OLED)," Materials, vol. 11, 2018, 11 pages.

Morad, M.R. et al., "A Very Stable High Throughput Taylor Cone-jet in Electrohydrodynamics," Scientific Reports, vol. 6, 2016, 10 pages.

Padhi, A.K. et al., "Phospho-olivines as Positive-Electrode Materials for Rechargeable Lithium Batteries," J. Electrochem. Soc., vol. 144, No. 4, Apr. 1997, 7 pages.

Smith, J. et al., "Droplet Evaporation and Discharge Dynamics in Electrospray Ionization," J. Phys. Chem. A, vol. 106, 2002, pp. 9957-9967.

Stoeva, Z. et al., "Effect of pressure on ion transport in amorphous and semi-crystalline polymer electrolytes," Phys. Chem. Chem. Phys., vol. 5, 2003, pp. 395-399.

Wang et al., "Simultaneous Electrospinning and Electrospraying: Fabrication of a Carbon Nanofibre/MnO/Reduced Graphene Oxide Thin Film as a High-Performance Anode for Lithium-Ion Batteries," ChemElectroChem, vol. 5, 2018, pp. 51-61.

Al-Shroofy, M. et al., "Solvent-free dry powder coating process for low-cost manufacturing of LiNi1/3Mn1/3Co1/3O2 cathodes in lithium-ion batteries," Elsevier Journal of Power Sources, vol. 352, 2017, pp. 187-193.

Cavaliere, S. et al., "Electrospinning: designed architectures for energy conversion and storage devices," Energy & Environmental Science, vol. 4, 2011, pp. 4761-4785.

Chen, R. et al., "The pursuit of solid-state electrolytes for lithium batteries: from comprehensive insight to emerging horizons," RSC Materials Horizons, vol. 3, 2016, pp. 487-516.

Ding, Y. et al., "Flexible PI/BaTiO3 dielectric nanocomposite fabricated by combining electrospinning and electrospraying," European Polymer Journal, vol. 49, 2013, pp. 2567-2571.

Erol, S., "A Fibrous Solid Electrolyte for Lithium-Ion Batteries," 3rd International Conference on New Trends in Chemistry, Apr. 28-30, 2017, Helsinki, Finland, 13 pages.

Fu, K. et al., "Flexible, solid-state, ion-conducting membrane with 3D garnet nanofiber networks for lithium batteries," PNAS, vol. 113, No. 26, 2016, pp. 7094-7099.

Hassoun, J. et al., "A lithium ion battery using nanostructured Sn-C anode, LiFePo4 cathode and polyethylene oxide-based electrolyte," Elsevier Solid State Ionics, vol. 202, 2011, pp. 36-39.

Hwang, T. H. et al., "Electrospun Core-Shell Fibers for Robust Silicon Nanoparticle-Based Lithium Ion Battery Anodes," Nano Letters, vol. 12, 2012, pp. 802-807.

Jayaraman, S. et al., "Exceptional Performance of TiNb2O7 Anode in All One-Dimensional Architecture by Electrospinning," Applied Materials & Interfaces, vol. 6, 2014, pp. 8660-8666.

Kancheva, M. et al., "Enhancing the mechanical properties of electrospun polyester mats by heat treatment," eXPRESS Polymer Letters, vol. 9, No. 1, 2015, pp. 49-65.

Kancheva, M. et al., Materials from Nanosized ZnO and Polyacrylonitrile: Properties Depending on the Design of Fibers (Electrospinning or Electrospinning/Electrospraying), J Inorg Organomet Polym, vol. 27, 2017, pp. 912-922.

Kerman, K. et al., "Review-Practical Challenges Hindering the Development of Solid State Li Ion Batteries," Journal of the Electrochemical Society, vol. 164, No. 7, 2017, pp. A1731-A1744.

Kim, J. G. et al., "A review of lithium and non-lithium based solid state batteries," Journal of Power Sources, vol. 282, 2015, pp. 299-322.

Korina, E. et al., "Multifunctional Hybrid Materials From Poly(e-Hydroxybutyrate), TiO2 Nanoparticles, and Chitosan Oligomers by Combining Electrospinning/Electrospraying and Impregnation," Wiley Macromolecular Bioscience, vol. 13, 2013, pp. 707-716.

Ramasundaram, S. et al., "Photocatalytic applications of paper-like poly(vinylidene fluoride)-titanium dioxide hybrids fabricated using a combination of electrospinning and electrospraying," Journal of Hazardous Materials, vol. 285, 2015, pp. 267-276.

Robitaille, C.D. et al., "Phase Diagrams and Conductivity Characterization of Some PEO_LiX Electrolytes," Journal of the Electrochemical Society, vol. 133, No. 2, 1986, 11 pages.

Schnell, J. et al., "All-solid-state lithium-ion and lithium metal batteries—paving the way to large-scale production," Journal of Power Sources, vol. 382, 2018, pp. 160-175.

Self, E. et al., "LiCoO2-Based Fiber Cathodes for Electrospun Full Cell Li-ion Batteries," Electrochimica Acta, vol. 214, 2016, pp. 139-146.

Self, E. et al., "High Performance Particle/Polymer Nanofiber Anodes for Li-ion Batteries using Electrospinning," Wiley ChemSusChem, vol. 9, 2016, pp. 208-215.

Self, E. et al., "High Areal Capacity Si/LiCoO2 Batteries from Electrospun Composite Fiber Mats," Wiley ChemSusChem, vol. 10, 2017, pp. 1823-1831.

Sun, C. et al., "Recent advances in all-solid-state rechargeable lithium batteries," Nano Energy, vol. 33, 2017, pp. 363-386.

Takami, N. et al., "12 V-Class Bipolar Lithium-Ion Batteries Using Li4Ti5O12 Anode for Low-Voltage System Applications," ECS Journal of the Electrochemical Society, vol. 164, No. 1, 2017, pp. A6254-A6259.

Tao, D. et al., "Lithium vanadium phosphate as cathode material for lithium ion batteries," Springer Ionics, vol. 21, 2015, pp. 1201-1239.

Whiteley, J. et al., "Tin in Networked Electrode Provoding Enhanced Volumetric Capacity and Pressureless Operation for All-Solid-State Li-Ion Batteries," Journal of the Electrochemical Society, vol. 162, No. 4, 2015, pp. A711-A715.

Winter, M. et al., "Electrochemical lithiation of tin and tin-based intermetallics and composites," Electrochimica Acta, vol. 45, 1999, pp. 31-50.

Xu, Y. et al., "3D Si/C Fiber Paper Electrodes Fabricated Using a Combined Electrospray/Electrospinning Technique for Li-Ion Batteries," Wiley Advanced Energy Materials, vol. 5, 2015, 7 Pages.

Xue, Z. et al., "Poly(ethylene oxide)-based electrolytes for lithium-ion batteries," Journal of Materials Chemistry A, vol. 3, 2015, pp. 19218-19253.

Yang, T. et al., "Nanostructured Garnet-Type Solid Electrolytes for Lithiium Batteries: Electrospinning Synthesis of Li7La3Zr2O12 Nanowires and Particle Size-Dependent Phase Transformation," Journal of Physical Chemistry C, vol. 119, 2015, pp. 14947-14953.

Yang, T. et al., "Composite Polymer Electrolytes with Li7La3Zr2O12 Garnet-Type Nanowires as Ceramic Fillers: Mchannism of Conductivity Enhancement and Role of Doping and Morphology," Applied Materials & Interfaces, vol. 9, 2017, pp. 21773-21780.

Yin, Y.A. et al., "Electrospray Synthesis of Silicon/Carbon Nanoporous Microspheres as Improved Anode Materials for Lithium-Ion Batteries," Journal of Physical Chemistry C, vol. 115, 2011, pp. 14148-14154.

Yu, C. et al., "Accessing the bottleneck in all-solid state batteries, lithium-ion transport over the solid-electrolyte-electrode interface," Nature Communications, DOI: 10.1038/s41467-017-01187-7.

(56) References Cited

OTHER PUBLICATIONS

Yu, Y. et al., Electrochemical performance of nano-SiO2 modified LiCoO2 thin films fabricated by electrostatic spray deposition (ESD), Electrochimica Acta, vol. 51, 2006, pp. 3292-3296.
Zhang, X. et al., "Electrospun Nanofiber-Based Anodes, Cathodes, and Separators for Advanced Lithium-Ion Batteries," Polymer Review, vol. 51, 2011, pp. 239-264.
Kim, J.K. et al., "Y-Fe2O3 nanoparticles encapsulated in polypyrrole for quasi-solid-state lithium batteries," Journal of Materials Chemistry A, vol. 2, 2014, pp. 3551-3556.
International Search Report and Written Opinion from corresponding PCT patent application No. PCT/US19/61193 dated Apr. 2, 2020, 7 pages.

\* cited by examiner

SOLID-STATE ENERGY STORAGE DEVICES AND METHODS OF MAKING THE SAME

CROSS-REFERENCE TO RELATED APPLICATION

This application claims priority from U.S. Provisional Application No. 62/760,166, filed Nov. 13, 2018, the disclosure of which is incorporated herein by reference in its entirety.

CONTRACTUAL ORIGIN

The United States Government has rights in this disclosure under Contract No. DE-AC36-08GO28308 between the United States Department of Energy and Alliance for Sustainable Energy, LLC, the Manager and Operator of the National Renewable Energy Laboratory. This invention was made with government support under grant number FA9453-15-1-0304, awarded by the Air Force Research Lab. The government has certain rights in the invention.

BACKGROUND

Meeting grid and transportation energy needs without fossil fuels demands drastically improved energy storage technologies. Energy-dense lithium ion batteries (LIBs) have come to the forefront of energy storage research, but traditional LIBs have been plagued by electrode degradation, thermal instabilities, and volatile electrolytes. To overcome these challenges, solid-state electrolytes (SSEs) and all solid-state batteries (SSBs) have been considered as potential replacements for liquid electrolytes and conventional liquid-electrolyte batteries, respectively. SSBs demonstrate reduced cell porosity and reduced electrolyte flammability, increased energy density, and improved battery safety.

However, the benefits of solid-state batteries are often outweighed by manufacturing challenges due to air and moisture sensitive materials, mechanically fragile solid electrolytes, and the lack of viable full-scale manufacturing methods. These characteristics hinder commercialization of SSBs and render them financially uncompetitive. Scalable manufacturing techniques including wet printing, screen printing and tape casting have been explored, but large impedance at the solid-solid interface between electrolyte and electrodes layers still hinders SSB performance. Thus, the complexity and expense of manufacturing all-solid-state batteries continues to hinder the development of large-scale solid-state batteries for transportation and grid storage applications. Therefore, there remains a need for improved solid-state batteries and methods of making solid-state batteries that, among other things, solve issues like electrolyte-electrode interfacial resistance, air and moisture instability, and expensive and/or complicated manufacturing methods.

SUMMARY

An aspect of the present disclosure is a system that includes a first deposition system that includes a first cylinder having a first outer surface configured to hold a first substrate, a first spray nozzle configured to receive at least a first fluid, and a first fiber nozzle configured to receive at least a second fluid, where the first spray nozzle is configured to operate at a first voltage, the first fiber nozzle is configured to operate at a second voltage, the first cylinder is configured to be electrically connected to ground, the first spray nozzle is configured to apply onto the substrate a first plurality of at least one of particles or droplets from the first fluid, the first fiber nozzle is configured to apply onto the substrate a first fiber from the second fluid, and the first plurality of particles or droplets and the first fiber combine to form a first composite layer on the substrate.

In some embodiments of the present disclosure, the first spray nozzle may include a first tip having an inside diameter between 0.05 mm and 3.0 mm.

In some embodiments of the present disclosure, the first fluid may include a cathode active material and/or an anode active material.

In some embodiments of the present disclosure, the cathode active material may include at least one of a lithium metal oxide, a lithium iron phosphate, and/or a vanadium oxide.

In some embodiments of the present disclosure, the lithium metal oxide may include $LiMO_2$ where M includes a transition metal.

In some embodiments of the present disclosure, the transition metal may include at least one of nickel, manganese, cobalt, and/or aluminum.

In some embodiments of the present disclosure, the lithium metal oxide may include lithium titanium oxide.

In some embodiments of the present disclosure, the anode active material may include at least one of graphite and/or an intermetallic alloy.

In some embodiments of the present disclosure, the first spray nozzle may include a second tip having an inside diameter between 0.05 mm and 3.0 mm.

In some embodiments of the present disclosure, the second fluid may include a polymer and a salt.

In some embodiments of the present disclosure, the polymer may include at least one of poly(ethylene oxide), polyacrylonitrile, poly(vinylidene fluoride), and/or poly(methyl methacrylate).

In some embodiments of the present disclosure, the salt may include at least one of $LiClO_4$, LiTFSI, and/or LiFSI.

In some embodiments of the present disclosure, the first voltage may be between one kV and 100 kV.

In some embodiments of the present disclosure, the second voltage may be between one kV and 100 kV.

In some embodiments of the present disclosure, the substrate may include an electrically conductive material.

In some embodiments of the present disclosure, the first deposition system may further include a first compression system configured to transform the first composite layer having a first solid density to a second composite layer having a second solid density, and the second solid density is greater than the first solid density.

In some embodiments of the present disclosure, the system may further include a second deposition system that may include a second cylinder having a fourth outer surface configured to receive the second composite layer, and a second fiber nozzle configured to receive at least a third fluid, where the second fiber nozzle is configured to operate at a third voltage, the second cylinder is configured to be electrically connected to ground, the second fiber nozzle is configured to apply onto the second composite layer a second fiber from the third fluid, and the second fiber forms a third composite layer on the second composite layer.

In some embodiments of the present disclosure, the system may further include a third deposition system that may include a third cylinder having a seventh outer surface configured to receive the fourth composite layer, a second spray nozzle configured to receive at least a fourth fluid, and a third fiber nozzle configured to receive at least a fifth fluid, where the second spray nozzle is configured to operate at a fourth voltage, the third fiber nozzle is configured to operate at a fifth voltage, the third cylinder is configured to be electrically connected to ground, the second spray nozzle is configured to apply onto the fourth composite layer a second plurality of at least one of particles or droplets from the fourth fluid, the third fiber nozzle is configured to apply onto the fourth composite layer a second fiber from the fifth fluid, and the second plurality of particles or droplets and the third fiber combine to form a fifth composite layer on the fourth composite layer.

An aspect of the present disclosure is a solid-state battery that includes, in order, a solid cathode layer, a solid electrolyte layer, and a solid anode layer, where the solid cathode layer includes a first active material, a first polymer, and a first salt, the solid electrolyte layer includes a second polymer and a second salt, the solid anode layer includes a second active material, a third polymer, and a third salt, the first active material, the first polymer, and the first salt are uniformly mixed, the second active material, the third polymer, and the third salt are uniformly mixed, and each layer has a solid density between 1.0 g/ml and about 2.5 g/ml.

An aspect of the present disclosure is a method of making a solid-state battery, where the method includes a first depositing of a solid cathode layer onto a substrate, where the first depositing includes a first electrospraying of a cathode active material onto the substrate and a first electrospinning of a first electrolyte material onto the substrate, where the first electrospraying and the first electrospinning result in the combining of the cathode material and the first electrolyte material to form the solid cathode layer having a first density.

BRIEF DESCRIPTION OF THE DRAWINGS

Some embodiments are illustrated in referenced figures of the drawings. It is intended that the embodiments and figures disclosed herein are to be considered illustrative rather than limiting.

REFERENCE NUMBERS

Figure 1:
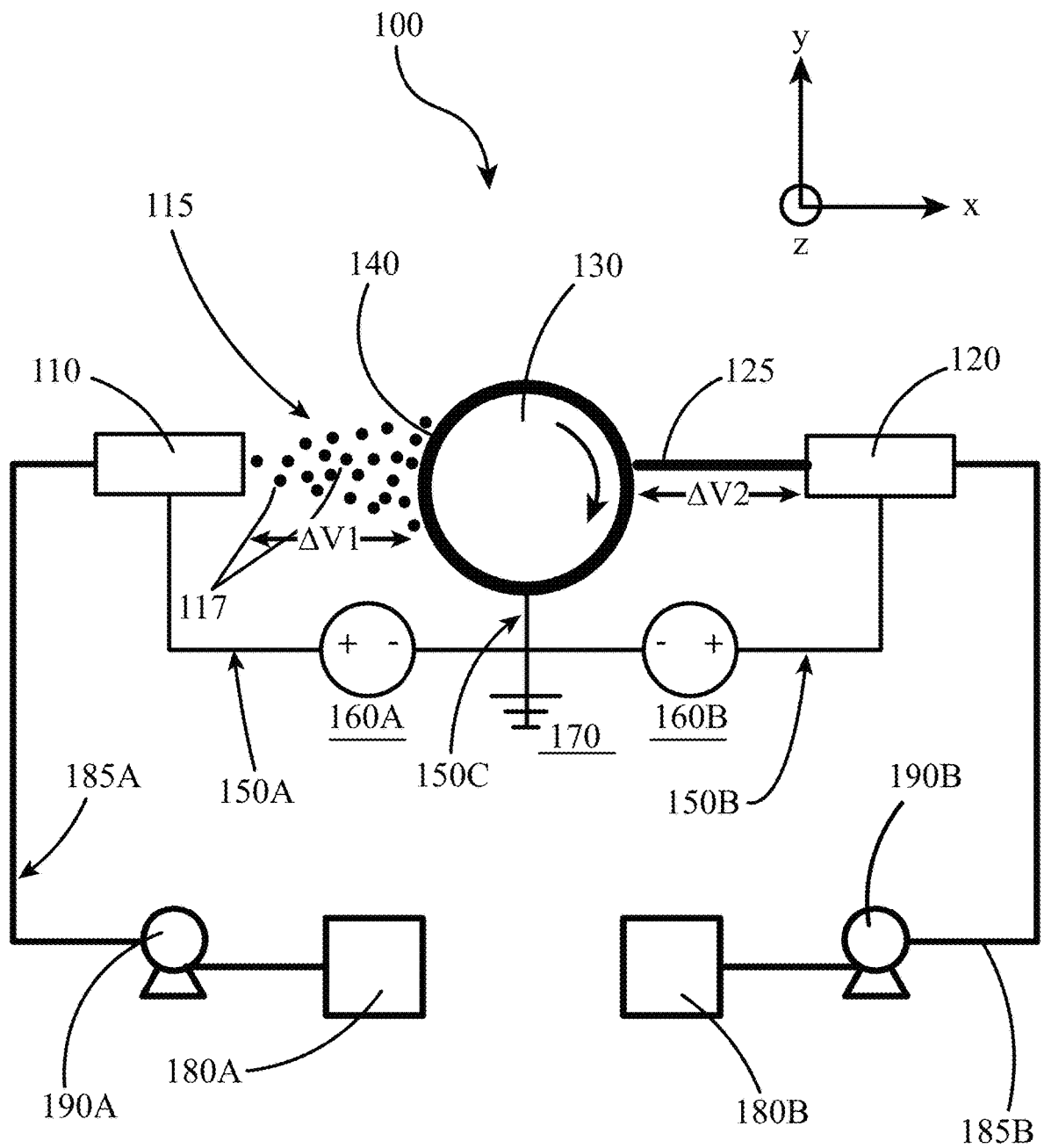
FIG. 1 illustrates a system for manufacturing composite solid-state materials, according to some embodiments of the present disclosure.

100 ... system
110 ... spray nozzle
115 ... spray
117 ... particles and/or droplets
120 ... fiber nozzle
125 ... fiber
130 ... cylinder
140 ... substrate
150 ... electrical connection
160 ... voltage source
170 ... ground
180 ... reservoir
185 ... transfer line
190 ... means for providing a driving force
200 ... deposition station
210 ... guide roller
220 ... compression system
225 ... compression roller 230 . . . first composite layer
240 . . . first compressed layer
300 . . . manufacturing system
310 . . . second composite layer
320 . . . second compressed layer
330 . . . third composite layer
340 . . . third compressed layer
350 . . . intermediate device
360 . . . device stack
500 . . . multi-stack device
510 . . . interconnect
520 . . . insulating layer
600 . . . method
605 . . . providing a substrate
610 . . . first depositing
620 . . . first compressing
630 . . . second depositing
640 . . . second compressing
650 . . . third depositing
660 . . . third compressing

DETAILED DESCRIPTION

The present disclosure may address one or more of the problems and deficiencies of the prior art discussed above. However, it is contemplated that some embodiments as disclosed herein may prove useful in addressing other problems and deficiencies in a number of technical areas. Therefore, the embodiments described herein should not necessarily be construed as limited to addressing any of the particular problems or deficiencies discussed herein.

References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

The present disclosure relates to a new battery manufacturing method designed, among other things, to overcome battery component interfacial resistances by depositing solid-state cathode layers, solid-state electrolyte layers, and solid-state anode layers directly on top of one another. This method enables using a variety of solid-state electrode materials and solid-state electrolyte materials to manufacture all-solid-state batteries, in some embodiments, in ambient environments (e.g. room temperature, atmospheric [air] conditions). Furthermore, the approaches presented herein enable roll-to-roll processing methods, allow for the utilization of a wide range of materials, and realize the development of potentially scalable and affordable manufacturing methods. Some of the proposed manufacturing methods described herein illustrate the successful manufacture of all-solid-state batteries, e.g. having each of a solid-state cathode, a solid-state anode, and a solid-state electrolyte. More specifically, some embodiments of the present disclosure integrate the fiber production methods of electrospinning with the material application process of electrospraying to create a flexible and scalable process capable of producing all-solid-state batteries. In some embodiments of the present disclosure, electrospinning and electrospraying techniques are used to apply successive layers, e.g. cathode layer, electrolyte layer, and anode layer, onto a cylinder collector using an applied electric field, resulting in a laminated all-solid-state battery. Among other things, low-cost electrospray/electrospinning techniques may facilitate the formation of uniformly distributed submicron sized particles and/or droplets for the formation of each of the anode layer, the cathode layer, and the electrolyte layer, on an ion conductive and/or electrically conductive non-woven fabric supplied by electrospinning.

FIG. 1 illustrates a system 100 for producing solid-state energy storage devices, for example lithium-containing, sodium-containing, and/or magnesium-containing batteries, according to some embodiments of the present disclosure. In this example, the system 100 utilizes a spray nozzle 110 for electrospraying at least one compound onto a substrate 140 positioned on a rotating cylinder 130. As the cylinder 130 rotates, the spray nozzle 110 creates a spray 115 of particles and/or droplets 117 that are dispersed in the empty space between the spray nozzle 110 and the cylinder 130, resulting in the uniform deposition of the sprayed material onto the substrate 140. The spray nozzle 110 may be electrically connected to the cylinder 130 by an electrical connection 150A (e.g. a suitably conductive wire; copper, aluminum, etc.). The cylinder 130 may be electrically connected to a ground 170 by an electrical connection 150C. A first voltage source 160A may be positioned (e.g. electrically connected) in the electrical connection 150A so that the spray nozzle 110 is operated at a first voltage, $\Delta V1$, which may create a first electric field between the spray nozzle 110 and the cylinder 130. Thus, in some embodiments, the spray nozzle 110 may operate essentially as a first electrode and the cylinder 130 as its counter electrode. This type of operation is referred herein as "electrospraying". Voltages may be on the order of magnitude of kilovolts. The distance between the spray nozzle 110 and the substrate 140 positioned on the cylinder 130, the distance from the spray nozzle 110 tip from which the spray is ejected to the substrate 140, can range from several centimeters to tens of centimeters (such as between 1 cm and 100 cm or between 5 cm and 20 cm). For example, a cathode electrospraying deposition was performed at a first voltage, $\Delta V1$, between 15 kV and 20 kV with a 7 cm spray nozzle 110 tip (where "tip" refers to the point of discharge of the liquid/suspension from the spray nozzle) to cylinder 130 distance. This distance is defined as the shortest distance from the nozzle tip to the substrate 140 positioned on the cylinder 130. A continuous feed of electrode fluid and/or suspension (for either a cathode or an anode) was controlled using positive displacement syringe pumps at a controllable speed (such as one gram of solids per hour, or 4 mL of suspension per hour). The electrode suspension may include carbon and polymer additives dissolved and/or suspended in a solvent. The solvent may be an organic solvent (such as acetonitrile) and/or an aqueous solvent. A needle (such as a 17-gauge) may be used as an electrospraying nozzle (i.e. spray nozzle 110). An exemplary cylinder 130, used in some of the embodiments described herein, had a width of 10 inches and a circumference of 14 inches with a front-to-back motion controller. Such a system may be used to deliver a suspension for manufacturing, where the suspension includes at least one of an active material (for either a cathode or an anode), a conductive additive, a binder, and/or any other material needed for a composition of interest. Of course, the cylinder dimensions may be increased as needed to scale to manufacturing production rates.

The exemplary system 100 of FIG. 1 also includes a fiber nozzle 120 for electrospinning at least one compound onto the substrate 140 positioned on the rotating cylinder 130. The fiber nozzle 120 forms at least one fiber 125, which spans a distance between the fiber nozzle 120 and the substrate 140 such that the fiber 125 may be uniformly deposited onto the substrate 140 as the cylinder 130 rotates. The fiber nozzle 120 may be electrically connected to the cylinder 130 by an electrical connection 150B. A second voltage source 160B may be positioned in the electrical connection 150B so that the fiber nozzle 120 is operated at a second voltage, $\Delta V2$, which may create a second electric field between the fiber nozzle 120 and the cylinder 130. This type of operation is referred herein as "electrospinning" for producing fibers. Voltages may be on the order of magnitude of kilovolts between the spray nozzle 110 and the cylinder 130, and the distance from the fiber nozzle 120 tip from which the fiber is ejected, to the substrate 140 positioned on the cylinder 130 may range from several centimeters to tens of centimeters (e.g. such as between 1 cm and 100 cm or between 5 cm and 20 cm). In some embodiments of the present disclosure, an electrospinning solution, pumped from the bulk solution (e.g. containing a polymer, salt, and solvent, for which all solids could completely dissolve) was exposed to a second voltage of about 10 kV potential, at a 7 cm fiber nozzle 120 tip to substrate 140 distance. In this example, the tip of the fiber nozzle 120 was a 22-gauge needle, and the flow rates were controlled using a syringe pump. The same cylinder 130 was used to collect the fibers 125 and particles and/or droplets 117 from electrospinning and electrospraying components of the system 100. Together, the particles and/or droplets 117 formed by the spray nozzle 110 and the fiber(s) 125 formed by the fiber nozzle 120 formed a composite layer (not shown) on the substrate 140. More details regarding such composite layers are provided below and in FIGS. 2-4. As used herein, a nozzle tip for electrospraying or electrospinning may have an inside diameter between 0.08 mm and 3.8 mm.

Both the spray nozzle 110 and the fiber nozzle 120 may move relative to the length of the cylinder 130, in the direction of the z-axis (see FIG. 1), to uniformly deposit the particles and/or droplets 117 and/or the fiber(s) 125 onto the substrate 140 and across the substrate's width (also in the z-axis direction). In some embodiments of the present disclosure, at least one of the spray nozzle 110 and/or the fiber nozzle 120 may be positioned on a moving platform (not shown) that oscillates back and forth parallel to and along the length of the cylinder 130. Referring again to FIG. 1, this movement would be in and out of the page or perpendicular to the page. In some embodiments, at least one of the spray nozzle 110 and/or the fiber nozzle 120 may be positioned on a pivot point, such that at least one of the nozzles rotates on the pivot point through an arc that is sufficient to completely cover the substrate 140, along both its width direction (z-axis) and its length direction (x-axis), with the particles and/or droplets 117 and/or the fiber(s) 125. In some embodiments of the present disclosure, at least one of the nozzles (110 and/or 120) may rotate through an arc between greater than zero degrees and 180 degrees. In other cases, instead of moving the nozzles (110 and/or 120), the cylinder 130 itself may move in the z-axis direction to provide complete coverage of the particles and/or droplets 117 and the fiber(s) 125 onto the substrate 140 positioned on the cylinder 130, resulting in the formation of a uniform composite layer (not shown).

It should be noted that although the example illustrated in FIG. 1 shows a system 100 having both a spray nozzle 110 and fiber nozzle 120, and utilizing both electrospraying and electrospinning, some embodiments of the present disclosure may utilize only electrospraying or only electrospinning to deposit a layer (not shown) on the substrate 140. Thus, some embodiments of the present disclosure only one nozzle, either a spray nozzle 110 or a fiber nozzle 120, may be utilized to produce some of the layers (e.g. composite electrode layers) described herein. Similarly, some embodiments of the present disclosure may utilize one or more spray nozzles 110 and/or one or more fiber nozzles 120. More nozzles may be employed to enable more uniform coverage of the materials onto the substrate 140 and/or to produce composite layers made of two or more materials. In addition, as described in more detail below, some examples of the present disclosure may utilize electrostatic deposition methods for delivering and/or depositing solid materials (no liquids present in the material being fed to the spray nozzle 110 and/or fiber nozzle 120) to the substrate 140.

Referring again to FIG. 1, the exemplary system 100 also includes two material distribution systems, one for providing the materials of interest to the spray nozzle 110 and a second distribution system for providing the materials of interest to the fiber nozzle 120. As shown in FIG. 1, each fluid distribution system may include a reservoir (180A and 180B, respectively), a pump (190A and 190B, respectively) for delivering the fluids from the respective reservoir to the respective nozzle, and a transfer line (185A and 185B, respectively) for transferring the raw materials/compounds from their respective reservoir (180A and/or 180B) to their respective nozzle (110 and/or 120). The means for providing a driving force 180 depends on the phases of the materials being provided to the nozzles (110 and 120). For vapor phase materials, the pump 190 may be replaced by a compressor. For solid phase materials a pneumatic system, rotating screw, or powder coating system may be used. Examples of liquid pumps include positive displacement pumps (e.g. syringe pump) and centrifugal pumps.

Figure 2:
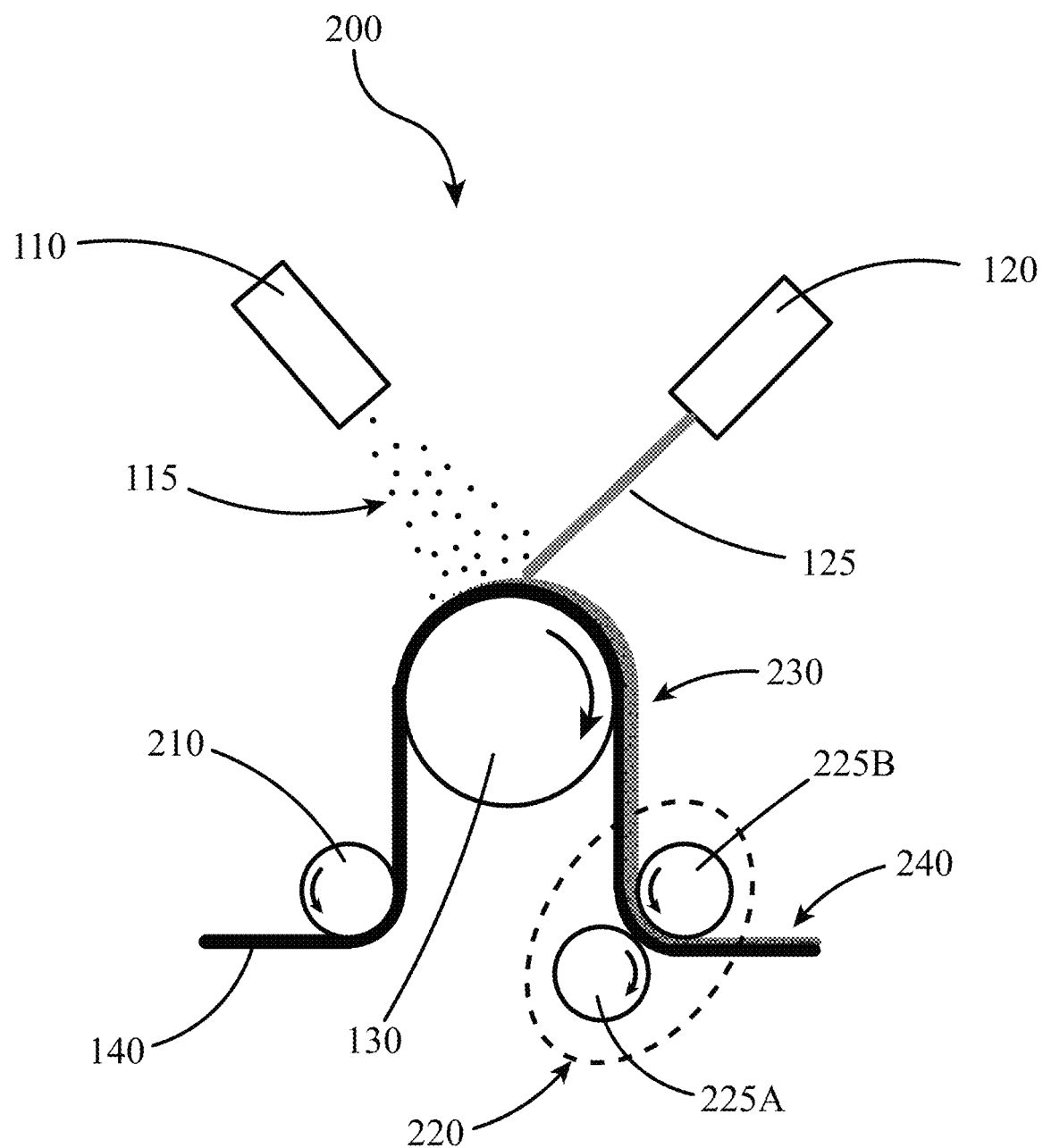
FIG. 2 illustrates a deposition system for manufacturing composite solid-state materials, according to some embodiments of the present disclosure.

FIG. 2 illustrates a deposition station 200 having several of the elements illustrated in the system 100 of FIG. 1. The deposition station 200 illustrates additional elements, according to some embodiments of the present disclosure, that enable a "roll-to-roll" system for producing solid-state materials, stacks, and/or devices; e.g. all-solid-state batteries having solid cathodes, solid electrolytes, and solid anodes. This exemplary deposition station 200 includes a spray nozzle 110 for electrospraying at least one first material onto a substrate 140 positioned on a cylinder 130, and a fiber nozzle 120 for electrospinning at least one second material onto the substrate 140, resulting in the formation of a first composite layer 230 positioned on the substrate 140. Compared to FIG. 1 in which the spray 115 and the fiber(s) 125 impinge upon the substrate 140 at different positions on the cylinder 130, e.g. separated by 180 degrees, the nozzles (110 and 120) of the exemplary deposition station 200 of FIG. 2 are configured to deposit the spray 115 and the fiber 125 onto substantially the same location on the substrate 140. The precise locations of the nozzles (110 and 120) may be positioned as needed at any point around the circumference of the cylinder 130. Thus, a first nozzle may be separated from a second nozzle, relative to the circumference of cylinder 130 between zero degrees and 180 degrees.

Figure 3:
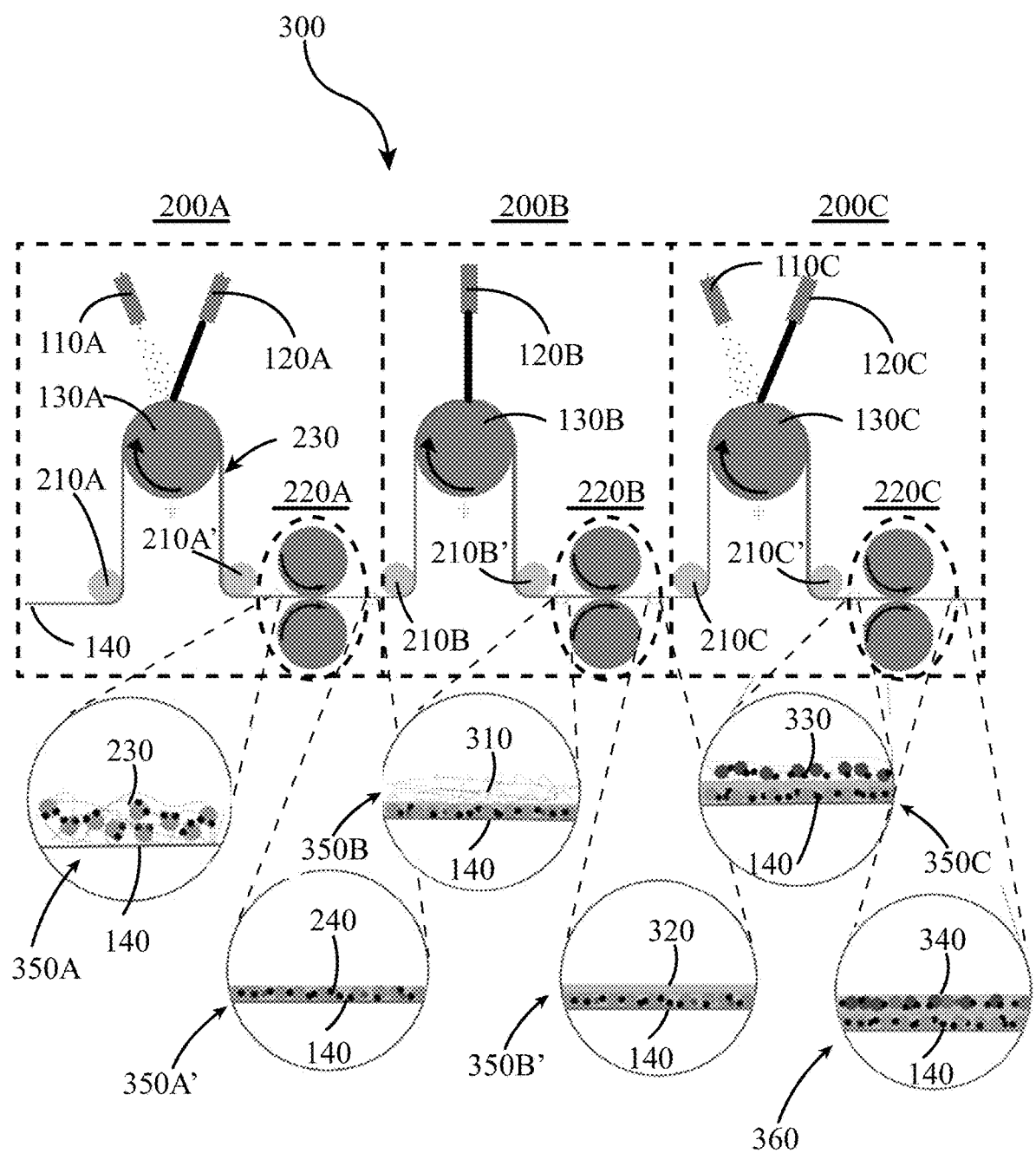
FIG. 3 illustrates a manufacturing system for producing composite solid-state materials, according to some embodiments of the present disclosure.

The deposition station 200 shown in FIG. 2 may be one of several deposition stations positioned in a larger "roll-to-roll" manufacturing system 300 as shown in FIG. 3. Thus, referring again to FIG. 2, the deposition system 200 may have one or more guide rollers (only one shown; guide roller 210) configured to feed a flexible substrate 140 to the cylinder 130 oriented to receive the spray 115 and/or fiber(s) 125 from the respective nozzles (110 and/or 120). In addition, a deposition station 200 may have one or more rollers (not shown) for directing the resultant product away from the cylinder 130. In some embodiments of the present disclosure, the deposition station 200 may include a compression system 220 such that the first composite layer 230 produced by electrospraying and/or electrospinning materials onto the substrate 140 is directed to the compression system 220 where the first composite layer 230 is compressed, resulting in a denser first compressed layer 240. As shown in FIG. 2, this compressing/densification of the first composite layer 230 to produce the first compressed layer 240 may be accomplished by a pair of compression rollers (225A and 225B) positioned adjacent to one another forming a gap through which the first composite layer 230 is directed. This gap may be selected to produce the desired thickness and/or density of the resulting first compressed layer 240. In some embodiments of the present disclosure, the gap may be between 1 μm and about 500 μm, with the resulting compressed composite layer having a similar thickness range.

In some embodiments of the present disclosure, a deposition station 200 may be operated at ambient conditions; e.g. about one atmosphere of pressure and between 20° C. and 25° C. in an air environment. In some embodiments of the present disclosure, the deposition station 200 may be operated at a temperature greater than 25° C., or at a temperature between 25° C. and 150° C. In some cases, the deposition station 200 may be operated at a pressure greater than one atmosphere or under vacuum conditions. In some embodiments of the present disclosure, the deposition station 200 may be operated in an inert environment (in nitrogen, helium, and/or argon environment) or in a reactive environment that promotes and/or inhibits reactions from occurring on the substrate 140 and/or in the first composite layer 230 and/or first compressed layer 240. In some embodiments of the present disclosure, the cylinder 130 (e.g. the cylinder's outer surface that is in contact with the substrate 140) may be operated at a temperature between 0° C. and 200° C., or at a temperature between 25° C. and 100° C. An elevated temperature may be desirable, for example, to facilitate the removal of undesired liquid phase and/or gas phase components from the layers being deposited onto the substrate 140. Although, FIGS. 2 and 3 illustrate compression rollers 225, other methods/devices for densifying any of the layers describe herein may be used and fall within the scope of the present disclosure; e.g. the use of opposing plates to compress individual sheets of material, etc. In some embodiments, the cylinder 130 may be heated to speed the drying process. In some embodiments, a radiant heater (not shown) may be utilized to heat any of the composite layers, on the cylinder 130 or elsewhere in the process. The rotation speed of the cylinder depends on the physical and chemical properties of materials being used in the system, such as concentration of suspension and solution, and vapor pressure and viscosity of solvents, in order to form uniform electrode or electrolyte layers. The cylinder may be rotated at any suitable speed needed to obtain the desired film properties, for example between 0.1 RPM and 100 RPM.

Referring again to FIG. 3, the exemplary manufacturing system 300 illustrated includes three deposition stations 200 connected together in series. In general, however, a manufacturing system may include one or more deposition stations, connected in series, or otherwise. FIG. 3 illustrates a first deposition station 200 utilizing both a spray nozzle 110A and a fiber nozzle 120A, which deposit materials onto a substrate 140, as the substrate 140 is guided over an underlying cylinder 300A, as described above and shown in FIG. 2. This electrospraying and the electrospinning provided in the first deposition station 200A result in a first composite layer 230, which is subsequently directed to a first compression system 220A (two opposing compression rollers) to produce a first compressed layer 240. Any combination of the substrate 140 with one or more layers (e.g. 230 and/or 240) positioned on the substrate 140 is referred to herein as an intermediate device 350. For example, the combination (stack) of the substrate 140 and the first composite layer 230 is referred to herein as the first intermediate device 350A and the combination of the substrate 140 with the first compressed layer 240 is referred to as the second intermediate device 350A'. Referring again to FIG. 3, each successive station (200B and 200C) in the manufacturing system 300 adds at least one more layer to the preceding intermediate device, resulting in a laminated device structure, and ultimately resulting in the final targeted device stack 360 (see FIG. 4). In some embodiments of the present disclosure, a first deposition station 200A may deposit a first solid-state electrode (e.g. cathode), a second station 200B may deposit a solid-state electrolyte, and a third station 200C may deposit a second solid-state electrode (e.g. anode).

Thus, a manufacturing system 300, like that shown in FIG. 3, may be configured to produce all-solid-state batteries. Thus, the manufacturing system 300 may begin with a first deposition station 200A that deposits a first solid-state electrode (cathode or anode) layer onto a substrate 140, a second deposition station 200B for depositing a solid-state electrolyte layer onto the first solid-state electrode layer, and a third deposition station 200C for depositing a second solid-state electrode layer (cathode or anode) onto the electrolyte layer. Beginning with the first deposition station 200, a spray nozzle 110A may deposit at least one material (e.g. one or more of an active material, a conductive additive, and/or a binder etc.) onto the substrate 140, while a fiber nozzle 120A simultaneously deposits at least an ion-conducting material, such as a salt-containing electrolyte, for example an ionically conductive polymer, resulting in a non-densified first composite layer 230 (e.g. a first electrode layer) and the first intermediate device 350A (substrate 140 plus the first composite layer 230). The first intermediate device 350A composed of the substrate 140 and the non-densified first composite layer 230 may then be directed through a first compression system 220A (two adjacent compression rollers) resulting in a second intermediate device 350A' composed of the first compressed layer 240 on the substrate 140, e.g. the first solid-state electrode layer (cathode or anode). Thus, in some embodiments of the present disclosure, the second intermediate device 350A' may be constructed of a first current collector, the substrate 140, and a first electrode (cathode or anode), the first compressed layer 240, positioned on the substrate.

Production of the complete solid-state battery, a device stack 360, may continue by directing the second intermediate stack 350A' (e.g. having the first electrode layer) to a second deposition station 200B configured for depositing a solid-state electrolyte layer on top of the first electrode (the first compressed layer 240). Referring again to FIG. 3, for this example, the second deposition station 200B may only have a single fiber nozzle 120B, which deposits an electrolyte material, e.g. an ionically conductive and flexible polymer, onto the first compressed layer 240, to form a second composite layer 310. The combination of the substrate 140, the first compressed layer 240, and the second composite layer 310 results in the third intermediate device 350B (e.g. a first solid electrode layer and a solid electrolyte layer). The second composite layer 310 may be a "composite" layer having more than one material and/or compound, or a "composite" layer may contain essentially only one material and/or compound. Thus, as defined herein, for purposes of simplicity, "composite" refers to either an essentially pure material and/or layer or a layer having more than one component. So, the term "composite" can also refer to a mixture of two or more materials and/or a layer made of two or more materials. The third intermediate device 350B may then be directed to a second compression system 220B (two adjacent compression rollers) where the second composite layer 310 is densified to form a second compressed layer 320, resulting in a fourth intermediate device 350B' constructed of the first compressed layer 240 positioned between the second compressed layer 320 and the substrate 140; e.g. a composite layer that includes a densified first electrode layer and a densified solid-state electrolyte layer. Therefore, at this point in the exemplary system, the solid-state battery may contain two of the three target components of this target device; the first solid-state electrode and the solid-state electrolyte layer.

Production of the complete solid-state battery, e.g. device stack 360, may continue by directing the fourth intermediate stack 350B' to a third deposition station 200C configured for depositing a second solid-state electrode (cathode or anode) layer on top of the solid-state electrolyte layer (the second compressed layer 320). Referring again to FIG. 3, for this example, the third deposition station 200C, like the first deposition station 200A, may include both a spray nozzle 110C and a fiber nozzle 120C.

The spray nozzle 110C may deposit one or more materials (e.g. one or more of an active material, a conductive additive, and/or a binder etc.) onto the second compressed layer 320 (the electrolyte layer), while the fiber nozzle 120C simultaneously deposits at least an ion-conducting material, or electrolyte, for example an ionically conductive polymer, resulting in a non-densified third composite layer 330. Thus, a fifth intermediate device 350C is produced, constructed of, in order, the substrate 140, the first compressed layer 240 (first electrode), the second compressed layer 320 (electrolyte layer), and the third composite layer 330 (non-densified second electrode). The fifth intermediate device 350C may then be directed through a third compression system 220C (e.g. two adjacent compression rollers) that densifies the third composite layer 330 into a third compressed layer 340, resulting in the final, targeted device stack 360 composed of, in order, the substrate (e.g. current collector), the first compressed layer 240 (e.g. first solid-state electrode), the second compressed layer 350A' (e.g. the solid-state electrolyte layer), and the third compressed layer 340 (e.g. the second solid-state electrode). A manufacturing system 300 may conclude with the deposition of a second current collector (not shown) on top of the third compressed layer 340, resulting in a complete all-solid-state battery. Other down-stream processing steps may also be included in a manufacturing system; e.g. heating, annealing, cutting, stamping, packaging, etc.

Referring again to FIG. 3, three compression systems (220A, 220B, and 220C) are illustrated. However, other manufacturing systems 300 that utilize less than three compression systems, or more than three compression systems, fall within the scope of the present disclosure. For example, in some embodiments of the present disclosure, a manufacturing system may deposit a third low density composite layer onto a stack of the second low density composite layer and the first low density composite layer, such that only a single compression system (220C) is utilized to compress all three low density composite layers in a single step. Similarly, FIG. 3 illustrates six guide rollers. Some embodiments of the present disclosure may utilize less than six guide rollers, or more than six guide rollers, depending on the design needs of the particular manufacturing system.

In some embodiments of the present disclosure, a solid-state cathode material may include at least one active material such as $LiFePO_4$, $LiCoO_2$, lithium transitional metal oxides (LiMO2, M represents one or more transitional metals), or high-voltage spinel materials $LiM_2O_4$ (M represents one or more transitional metals) and other cathode materials for sodium-ion batteries, magnesium-ion batteries. In addition, a solid-state cathode material may include at a least one conductive additive such as carbon black, carbon nanotubes, and/or various high surface area carbon materials and/or at least one binder such as polyvinylidene fluoride, polyimide, polyacrylonitrile, and/or polyacrylic acid, all intermixed with the material used for the electrolyte layer (described below). As used herein, "density" refers to bulk density, defined as total mass divided by total volume. So, as used herein, density includes pore volume within the solid, as well as interstitial spaces. In some embodiments of the present disclosure, an uncompressed layer, cathode layer, anode layer, and/or electrolyte layer, may have a density between 0.1 g/ml and 1.0 g/ml, or between 0.3 g/ml and 0.6 g/ml. In some embodiments a compressed layer, cathode layer, anode layer, and/or electrolyte layer, may have a density between 1.0 g/ml and 2.5 g/ml, or between 1.1 g/ml and 2.0 g/ml. A cathodic suspension will generally be between 20 and 80 solids percent content by weight and remaining weight is a solvent, where the binder is soluble in the solvent. Of the solids content, cathode active materials, conductive additive, and binder may be in a range between about 50 wt % and about 90 wt %, between about 25 wt % and about 5 wt %, and between about 25 wt % and about 5 wt %, respectively. Cathode active materials may include at least one of $LiFePO_4$, $LiNiMnCoO_2$, a $LiFePO_4$ derivative, a $LiNiMnCoO_2$ derivative, and/or any other suitable transition metal oxides. Conductive additives may include at least one of carbon black and/or carbon nanotubes. Binders may include at least one of PVDF and/or PAA. The thickness of a densified electrode layer can be 70 µm (in this exemplary system) or more broadly, between about 1 µm and about 500 µm, or between about 10 µm and about 100 µm.

In some embodiments of the present disclosure, a solid-state electrolyte material may include at least one flexible ion-conducting polymer such as polyethylene oxide and at least one salt for providing ions including lithium ions, sodium ions and magnesium ions, such as $LiClO_4$, LiTFSI (i.e. lithium bis(trifluoromethanesulfonyl)imide), and/or $NaClO_4$, $Mg(TFSI)_2$. Electrolyte solutions may contain polymers and salts up to the solubility limit of the solvent. Polymers may include poly-ethylene oxide and solvents may include at least one of acetonitrile, acetone, tetrahydrofuran and/or dimethylformamide. The concentration of the electrolyte solution may be between about 0.01 g/cm$^3$ and about 0.5 g/cm$^3$ (0.054 g/cm$^3$ used in the exemplary system described herein). In some embodiments of the present disclosure, a solid-state electrolyte layer may have a thickness between about 1 micron and about 100 microns, or between 1 micron and 5 microns.

In some embodiments of the present disclosure, a solid-state anode material may include at least one active material such as tin nanoparticles, silicon particles, graphite, and/or titanium oxide, at least one conductive additive such as carbon black, carbon nanotubes, and/or various high surface area carbon materials, and at least one binder such as polyvinylidene fluoride, polyacrylonitrile, and/or polyacrylic acid all intermixed with the material used for the electrolyte layer (described above). The anodic suspension may be made of anode active particles, polymer materials and carbon black, dissolved in the organic solvents in a variety of weight ratios. The solvents can be acetonitrile, acetone, tetrahydrofuran and dimethylformamide. The thickness of the anode layer may be between about 10 microns and about 100 microns.

Referring again to FIG. 1, one or more of the materials (described above) needed for producing a particular element of a solid-state battery may be stored in reservoirs (180A and 180B). For example, a first solution of $LiFePO_4$ (active material), carbon black (conductive additive), and polyvinylidene fluoride (binder) in a solvent (e.g. dimethylformamide) may be stored in a first reservoir 180A and delivered through a transfer line 185A by a means for providing a driving force 190A, in this case a pump, to a spray nozzle 110 that vaporizes and/or atomizes the solution. Upon exiting the spray nozzle 110, essentially all of the solvent contained in the starting solution and/or slurry may evaporate from the droplets 117 before the remaining materials (e.g. the active material, conductive additive, and binder) impinge upon the substrate 140 and deposit on the substrate 140 as a solid. Simultaneously, a second solution that includes at least an electrolyte material, for example a conductive polymer (e.g. polyethylene oxide), mixed with an ion-source material (e.g. lithium perchlorate; $LiClO_4$) in a solvent (e.g. acetonitrile), may be stored in a second reservoir 180B. The second solution containing the electrolyte material(s) may be delivered through a transfer line 185B by a means for providing a driving force 190B, in this case a pump, to the fiber nozzle 120 that creates an elongated fiber 125 that stretches between the fiber nozzle 120 and the cylinder 130. Referring again to FIG. 1, as the second solution exits the fiber nozzle 120A, substantially all of the solvent contained in the starting solution and/or slurry may evaporate from the fiber before the remaining materials (e.g. the electrolyte material and ion-source material) impinge upon the substrate 140 and deposit as a solid on the substrate 140. Referring again to FIG. 2, together, all of the components, the active material, conductive additive, and the binder from the spray nozzle 110A, and the electrolyte material and ion-source material from the fiber nozzle 120A combine on the substrate 140, positioned on the cylinder 130, to form the first composite layer 230, in this case, an uncompressed cathode layer. As shown in FIG. 3, the uncompressed cathode layer may then be fed to a compression system 220A to produce a first compressed layer 240, in this case, a compressed cathode layer positioned on the substrate 140 (e.g. current collector).

For the example of an intermediate device 350A' having a substrate 140 with a first compressed layer 320 (e.g. compressed cathode) positioned on the substrate 140 (e.g. current collector), the intermediate device 350A' may then be directed to a second deposition station 200B having at least a second cylinder 130B and an associated fiber nozzle 120B. In some embodiments of the present disclosure, the fiber nozzle 120 may be configured to deposit the material(s) needed to create a solid-state electrolyte layer onto the already deposited first solid-state electrode layer (cathode), which was deposited by the first deposition station 200. For example, the materials for a solid-state electrolyte layer may be provided in a liquid solution of lithium perchlorate (ion-source material) and polyethylene oxide (a flexible, ionically conductive polymer) mixed in a solvent (e.g. acetonitrile). Referring again to FIG. 1, the solution containing the electrolyte components may be stored in a storage tank 180 and delivered to the fiber nozzle 120 through a transfer line 185, for example, by the use of a pump. Referring again to FIG. 3, as the electrolyte solution exits the fiber nozzle 120B, substantially all of the solvent contained in the starting solution and/or slurry may evaporate from the fiber 125B before the remaining materials (e.g. the electrolyte material and ion-source material) impinge upon the substrate 140 and deposit as a solid on the substrate 140. This solid is the second composite layer 310, in this case, an uncompressed electrolyte layer. As shown in FIG. 3, the uncompressed electrolyte layer, as part of the third intermediate device 350B, may then be fed to a compression system 220B to produce a second compressed layer 320, in this case, a compressed electrolyte layer, positioned on a fourth intermediate device 350B'.

The fourth intermediate device 350B' may then be directed to a third deposition station 200C having at least a second cylinder 130C, an associated spray nozzle 110C, and an associated fiber nozzle 120C, configured to deposit the second solid-state electrode onto the solid-state electrolyte layer. For example, the materials for a second solid-state electrode layer may be provided in a liquid solution of tin nanoparticles, polyvinylidene fluoride (PVDF), and carbon black mixed in a solvent (e.g. dimethylformamide).

Referring again to FIG. 1, an exemplary solution containing tin nanoparticles (active material), polyvinylidene fluoride (PVDF) (ionically conductive polymer), and carbon black (conductive additive) mixed in a solvent may be stored in a first reservoir 180A and delivered through a transfer line 185A by a means for providing a driving force 190A, in this case a pump, to a spray nozzle 110 that vaporizes and/or atomizes the solution. Upon exiting the spray nozzle 110, essentially all of the solvent contained in the starting solution and/or slurry may evaporate from the droplets 170 before the remaining materials (e.g. the active material, conductive additive, and ionically conductive polymer) impinge upon the substrate 140 and deposit on the solid electrolyte layer as a solid. Simultaneously, a second solution that includes at least an electrolyte material, for example an ionically conductive polymer (e.g. polyethylene oxide), mixed with an ion-source material (e.g. lithium perchlorate; $LiClO_4$) in a solvent (e.g. acetonitrile), may be stored in a second reservoir 180B. The second solution containing the electrolyte material(s) may be delivered through a transfer line 185B by a means for providing a driving force 190B, in this case a pump, to the fiber nozzle 120 that creates an elongated fiber 125 that stretches between the fiber nozzle 120 and the cylinder 130. Referring again to FIG. 3, as the second solution exits the fiber nozzle 120C substantially all of the solvent contained in the starting solution and/or slurry may evaporate from the fiber before the remaining materials (e.g. the electrolyte material and ion-source material) impinge upon the solid electrolyte layer and deposit as a solid. Together, all of the components, the active material, conductive additive, and the ionically conductive polymer from the spray nozzle 110C, and the electrolyte material and ion-source material from the fiber nozzle 120C combine on the solid electrolyte layer to form the third composite layer 330, in this case, an uncompressed anode layer. As shown in FIG. 3, the uncompressed anode layer may then be fed to a compression system 220C to produce a third compressed layer 340, in this case, a compressed anode layer, and the final device stack 360. Note that in the absence of liquid solvents, at least one of solid-state layers described above may be deposited onto a device stack by the use of electrostatic deposition, where the materials are stored, delivered, and deposited onto a substrate and/or intermediate device in the solid phase (e.g. in the absence of a solvent and/or other liquids). Electrostatic deposition may eliminate the need for solvents, thus simplifying the process.

Figure 4:
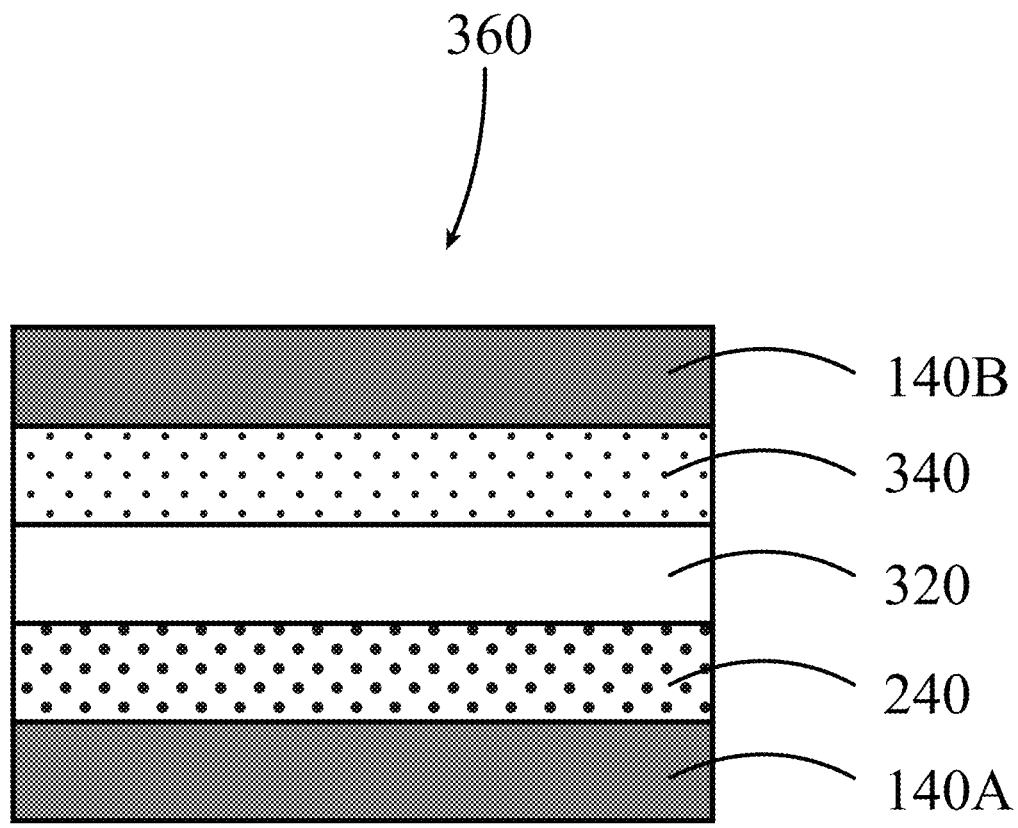
FIG. 4 illustrates a device stack produced according to some of the embodiments illustrated in FIGS. 1-3, according to some embodiments of the present disclosure.
Figure 5:
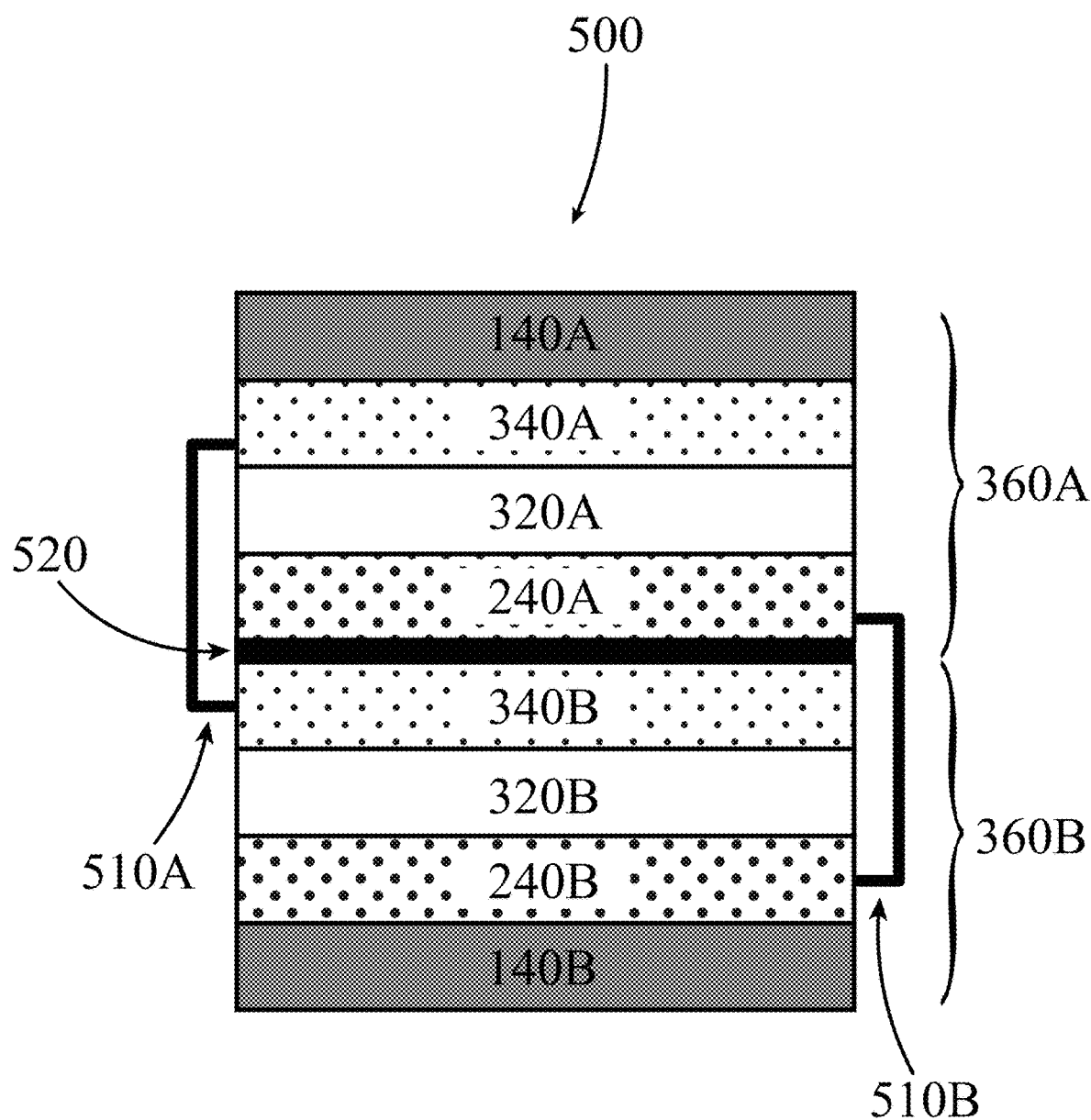
FIG. 5 illustrates a multi-stack device produced according to some embodiments of the embodiments illustrated in FIGS. 1-4, according to some embodiments of the present disclosure.

FIG. 4 illustrates an example of a device stack 360, according to some embodiments of the present disclosure. In this example, the device stack 360 includes, in order, a first substrate 140A (e.g. a first current collector), a first compressed layer 240 (e.g. a first electrode layer), a second compressed layer 320 (e.g. an electrolyte layer), a third compressed layer 340 (e.g. a second electrode layer), and a second substrate 140B (e.g. a second currently collector). FIG. 5 illustrates an embodiment of a multi-stack device 500, according to some embodiments of the present disclosure. In this example, the multi-stack device 500 includes two device stacks (360A and 360B) positioned on top of one another, positioned between two substrate layers (140A and 140B). In this example, the two device stacks (360A and 360B) of the multi-stack device 500 are connected in series, separated by an insulating layer 520. The first device stack 360A includes, in order starting at the interface to the first substrate 140A, a third compressed layer 340A, a second compressed layer 320A, and a first compressed layer 240A. Similarly, the second device stack 360B includes, in order starting at the interface to the first compressed layer 240A of the first device stack 360A, a third compressed layer 340B, a second compressed layer 320A, a first compressed layer 240B. The first device stack 360A is connected in series to the second device stack 360B, by electrically connecting, using a first interconnect 510A (an electrically conductive wire), the anode (the third compressed layer 340A) of the first device stack 360A to the anode (the third compressed layer 340B) of the second device stack 360B and, similarly, electrically connecting, using a second interconnect 510B (an electrically conductive wire), the cathode (the first compressed layer 240A) of the first device stack 360A to the cathode (the first compressed layer 240B) of the second device stack 360B. This series configuration results in a multi-stack device 500 having a voltage that is the sum of the voltages of the individual device stacks (e.g. 360A and 360B). Thus, high voltages can be achieved by stacking two or more device stacks in series.

Figure 6:
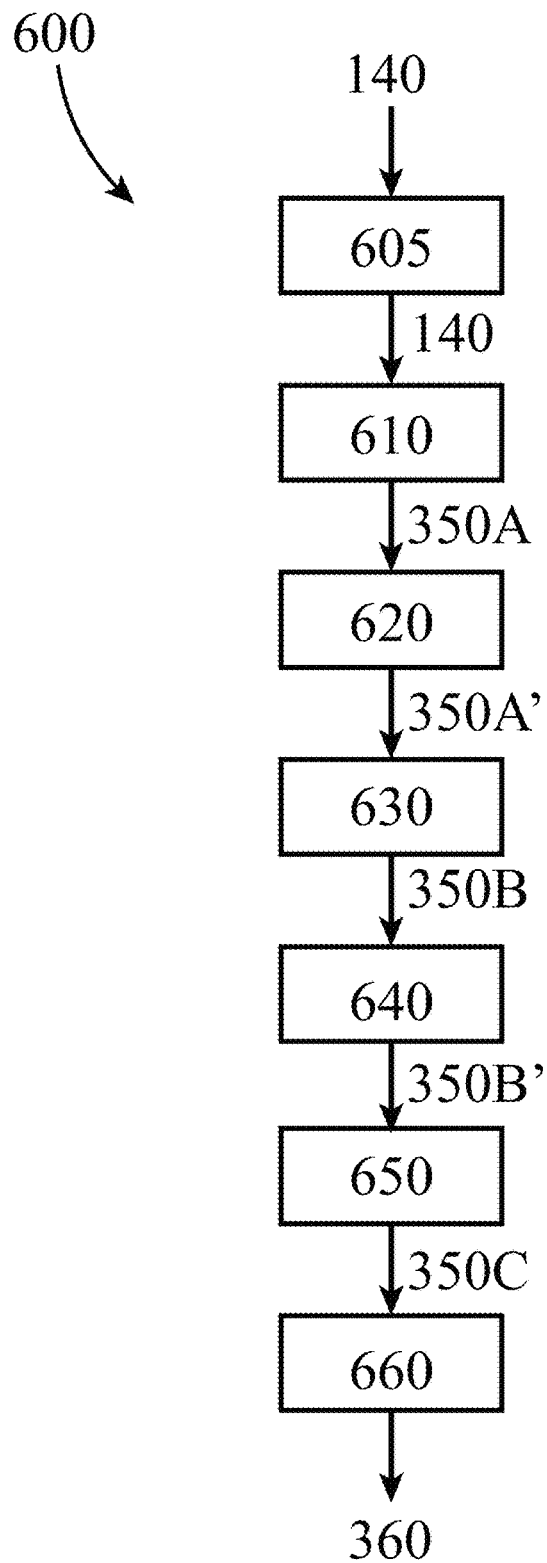
FIG. 6 illustrates a method for producing all-solid-state batteries, according to some embodiments of the present disclosure.

FIG. 6 illustrates a method 600 for produce a device stack 360, according to some embodiments of the present disclosure. This exemplary method 600 begins with a substrate 140 and the step of providing the substrate 605 to the manufacturing process. Possible substrates include copper, stainless steel, and/or aluminum foils. In typical roll-to-roll processing, substrate thicknesses are on the order of microns, and unwound off of a larger roll of wound substrate. Typically, the substrate is held in tension throughout the process. Once the substrate 140 has entered the manufacturing process it may be directed to a first depositing 610, for example a first deposition station as described above, in which a first electrode layer (cathode or anode) may be deposited onto the substrate 140, resulting in the forming of a first intermediate device 350A having a first composite layer. The first intermediate device 350A may then be directed to first compressing 620, wherein the first composite layer is densified into a first compressed layer positioned on a second intermediate device 350A', in this case a densified first electrode layer (cathode or anode). The second intermediate device 350A' may subsequently be directed to a second depositing 630, for example a second deposition system, in which an electrolyte layer may be deposited onto the first electrode layer, resulting in the forming of a third intermediate device 350B having a second composite layer. The third intermediate device 350B may then be directed to a second compressing 640, wherein the second composite layer is densified into a second compressed layer positioned on a fourth intermediate device 350B', in this case a densified electrolyte layer positioned on a densified first electrode layer. The fourth intermediate device 350B' may then be directed to a third depositing 640, for example a third deposition station as described above, in which a second electrode layer (cathode or anode) may be deposited onto the densified electrolyte layer, resulting in the forming of a fifth intermediate device 350C having a third composite layer. The fifth intermediate device 350C may then be directed to third compressing 660, wherein the third composite layer is densified into a third compressed layer resulting in the final device stack 360, an all-solid-state battery, having each of densified solid-state first electrode layer (e.g. cathode), a densified solid-state electrolyte layer, and a densified solid-state second electrode layer (e.g. anode). The processed final device stack 360 could be cut to various sizes and applied to existing battery form factors.

Based on the experimental data provided herein, in some embodiments of the present disclosure, an all-solid-state battery may include a cathode layer made of at least one of a lithium metal oxide for example $LiMO_2$ where M includes at least one transitional metal such as Ni, Mn, Co and/or Al, lithium titanium oxide, a lithium iron phosphate, and/or a vanadium oxide. In some embodiments of the present disclosure, an all-solid-state battery may include an electrolyte layer constructed of a polymer-based solid, for example, at least one of poly(ethylene oxide) (PEO), polyacrylonitrile (PAN), poly(vinylidene fluoride) (PVDF), and/or poly(methyl methacrylate) (PMMA). In addition, an electrolyte layer (PMMA) may include at least one salt such as at least one of LiClO$_4$, LiTFSI, and/or LiFSI (i.e. lithium bis(fluorosulfonyl) imide). In some embodiments of the present disclosure, an electrolyte layer may be constructed of a polymer-inorganic hybrid, for example (PEO/PVDF/PAN/PMMA-Li$_5$La$_3$M$_2$O$_{12}$ (M=Ta, Nb, Zr). In some embodiments of the present disclosure, an all-solid-state battery may include an anode layer constructed of at least one of graphite and/or an intermetallic alloy. In some embodiments of the present disclosure, an all-solid-state battery may have an energy density above 300 Wh/kg or an energy density between about 300 Wh/kg and about 400 Wh/kg. In some embodiments of the present disclosure, an all-solid-state battery may have an interfacial resistance of less than 100 ohm/cm$^2$. In some embodiments of the present disclosure, an all-solid-state battery may have an average solid density (total weight divided by total volume) between 1.0 g/ml and 2.5 g/ml.

Examples

The examples below illustrate the feasibility of a new battery manufacturing method designed to overcome the challenges of scaling and interfacial resistance by depositing very dense cathode, solid-state electrolyte, and anode layers directly on top of one another. This method enables using a variety of battery and solid-state electrolyte materials and can manufacture all-solid-state batteries in an ambient environment. This approach may enable a straightforward transition to a roll-to-roll process for large-scale production of all-solid-state batteries. An embodiment of a possible manufacturing method is demonstrated herein including, among other things, the creation and cycling of a cathode and electrolyte system.

Electrospinning and electrospraying both rely on the creation of high electric potentials to drive fibers (electrospinning) and particles and/or droplets (electrospraying) out of solution (e.g. droplets in the case of electrospraying) and onto substrates. In both cases, an electric field forms a Taylor cone at the tip of a nozzle. In some embodiments of the present disclosure, during electrospinning, a polymer solution is extruded from the Taylor cone. During electrospraying, the Taylor cone may emit charged particles and/or droplets. In both cases, all or substantially all of the solvents used in the feed solutions evaporate from the fibers and droplets prior to contact with the substrate. Parameters such as composition, solids content, solvent characteristics, flow rate, voltage, and needle size can influence the deposition process.

Electrospinning and electrospraying enable solid-state electrode creation through the synchronized deposition of SSE and active materials on to a single substrate. Embodiments of possible devices, systems, and methods are illustrated in FIGS. 1-6 and described above. In summary, the synchronized deposition resulting from combined electrospray and electrospinning results in the formation of a fibrous network of ionically conductive fibers containing embedded active material sites and electronic pathways provided by conductive additives. A rotating cylinder (i.e. drum) maintains even dispersion and layering of materials throughout the synchronized deposition. A compression step densifies the ductile and porous electrode into a very dense but still flexible electrode.

In the examples that follow, unless noted otherwise, all electrode and SSE deposition occurred in ambient conditions; e.g. room temperature and about one atmosphere of pressure. Independent SSE samples were created via electrospinning of polyethylene oxide (PEO, Sigma Aldrich) and lithium perchlorate (LiClO$_4$, Sigma Aldrich) on to copper foil. The molecular ratio of [EO]:[Li] was [17]:[1] and mixed in acetonitrile (ACN, Sigma Aldrich) overnight to create the electrospinning solution. Solution consisted of 54 g solids in liter of solvent.

Solid-state cathode electrode formation followed the process outlined in FIG. 1. The cathode electrospray solution consisted of LiFePO$_4$ (LFP), carbon black (CB, Sigma Aldrich) and polyvinylidene fluoride (PVDF, Sigma Aldrich) in a weight ratio of 70:25:5, with a possible range between 50:25:25 and 90:5:5, and mixed in dimethylformamide (DMF, Sigma Aldrich) overnight. The cathode mixture was deposited at 1 grams of solids per hour, and the SSE was deposited at ~0.25 grams of solids per hour on to an aluminum substrate. The SSE composition within the electrode remained the same from the independent SSE samples.

Electrodes and SSEs were dried at 50° C. for 48 hours under vacuum and the final assembly and cycling of all cells occurred under argon. Electrodes and SSE were compressed individually at 375 MPa, and then compressed together for half cells (e.g. cathode and electrolyte or anode and electrolyte) again at 375 MPa, all under argon. Half cells were cycled against a lithium metal counter electrode between 3.0 V and 3.8 V at 60° C.

All half cells underwent galvanostatic testing within a custom pressure housing. Galvanostatic testing was performed on an Arbin BT2000 Battery Testing Station. A Solartron 1280C Electrochemical Test System measured electrolyte conductivity via AC Impedance using copper blocking electrodes on either side of SSE. The SSE sample measured between 20 to 120 microns thick. Focused-ion beam (FIB) milling, scanning electron microscopy (SEM), and Energy Dispersive X-ray Spectroscopy (EDS) were all performed using a Thermo Fisher equipment. The electrospinning equipment was developed in house at the National Renewable Energy Laboratory.

Figure 7:
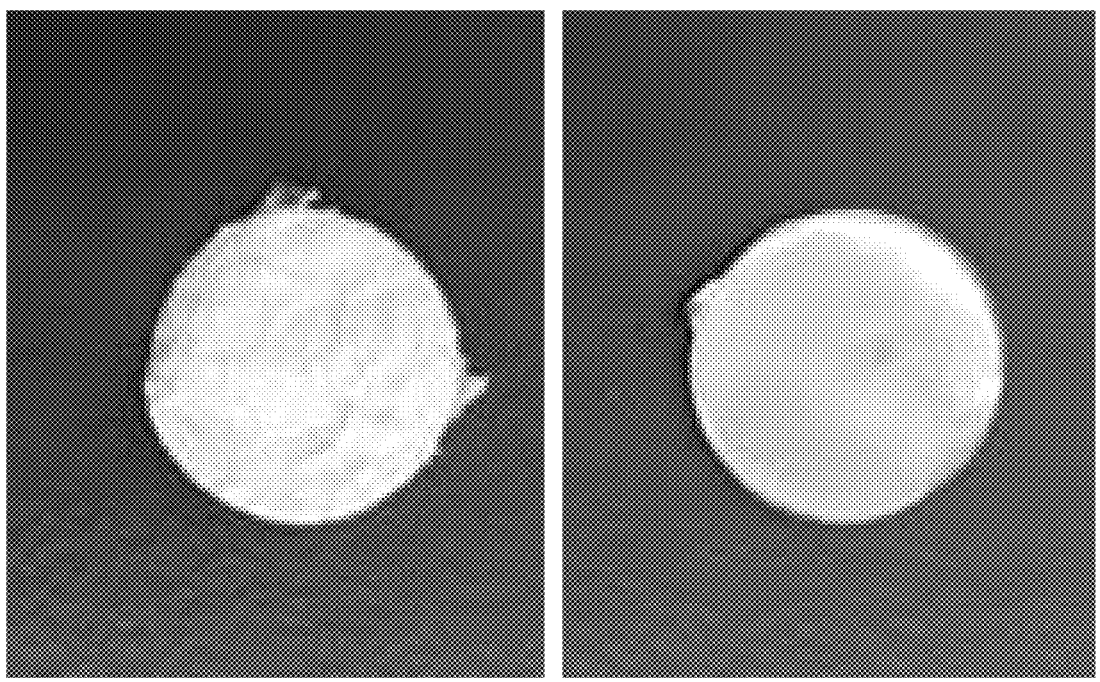
FIG. 7 illustrates an as-spun, porous fiber mat solid-state electrolyte layer (left) and a densified solid-state fiber mat (right) formed upon electrolyte compression, according to some embodiments of the present disclosure.
Figure 8:
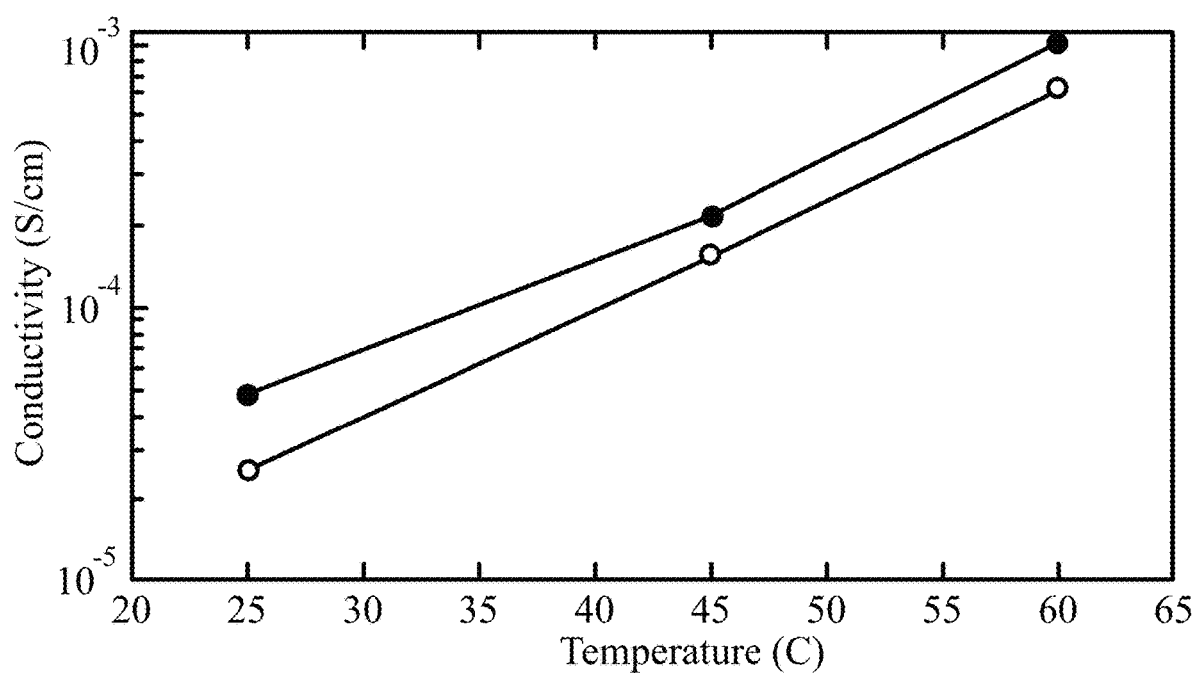
FIG. 8 illustrates a solid-state electrolyte layer's ionic conductivity as a function of temperature at two cycling pressures (solid circles=3.9 Pa; hollow circles=58 MPa), according to some embodiments of the present disclosure.
Figure 9:
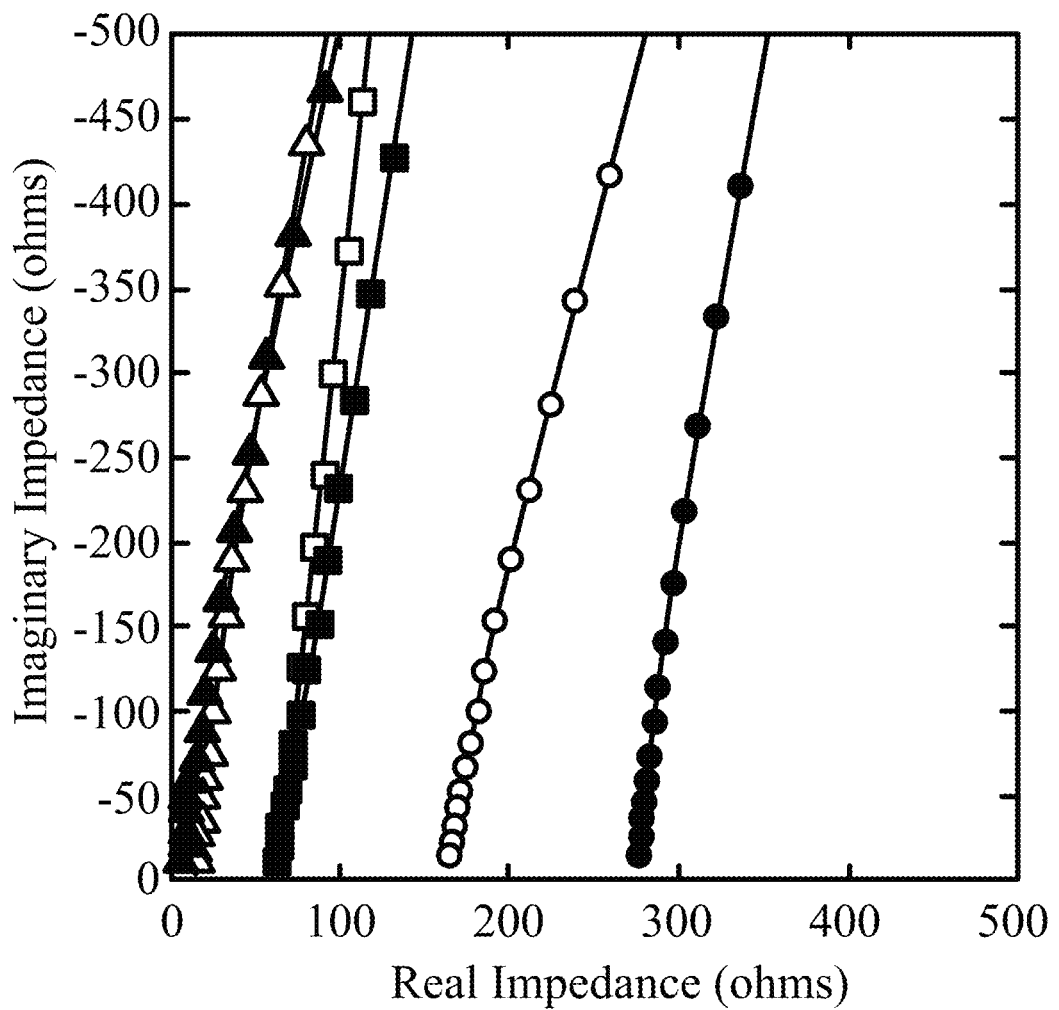
FIG. 9 illustrates AC impedance spectrum across various times and temperatures for a solid-state electrolyte layer, according to some embodiments of the present disclosure. (Legend: hollow circles=3.9 MPa, room temperature, 0.0488 mS/cm; solid circles=58.0 MPa, room temperature, 0.0254 ms/cm; solid squares=3.9 MPa, 45° C., 0.21 mS/cm; hollow squares=58.0 MPa, 45° C., 0.1517 mS/cm; solid triangles=58.0 MPa, 60° C., 0.6172 mS/cm; hollow triangles=3.9 MPa; 60° C., 0.9028 mS/cm.)

FIGS. 7 and 8 illustrate characteristics and measurements of a solid-state electrolyte, according to some embodiments of the present disclosure. The initial electrospun electrolyte fibers created a white and exceptionally ductile mesh material. Cold compaction (at 375 MPa and room temperature) of the fibers yielded a transparent, uniform solid. FIG. 7 compares these two states side by side with a solid-state PEO:LiClO$_4$ electrolyte layer on a copper foil substrate, which can act as a current collector. The fiber fusion needed to transform the states can likely be attributed to a highly amorphous fiber and/or trace ACN remaining in the fiber, both which enable fusion at relatively low pressure (e.g. ≤2 MPa). Conductivity of the PEO:LiClO$_4$ electrolyte was assessed at two different testing pressures across a range of temperatures from 25 to 60° C. AC impedance spectroscopy of the copper, electrolyte, copper cell (see FIG. 9) revealed a conductivity of 1*10$^{-3}$ S/cm at 60° C., consistent with PEO, lithium salt electrolytes created in other methods and sufficiently ionically conductive for electrode cycling. The results are shown in FIG. 8, which displays increasing conductivity as a function of increasing temperature as well as heightened conductivity at low testing pressures at room temperature.

Figure 10:
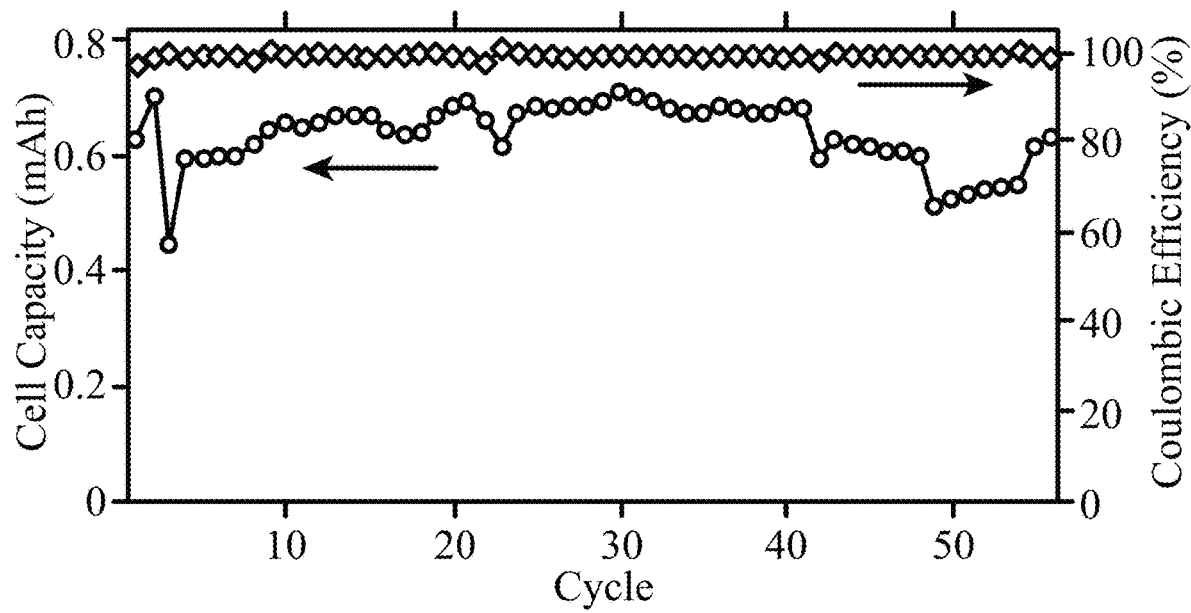
FIG. 10 illustrates performance metrics of a solid-state $LiFePO_4$ electrode cycled against lithium metal, according to some embodiments of the present disclosure.
Figure 11:
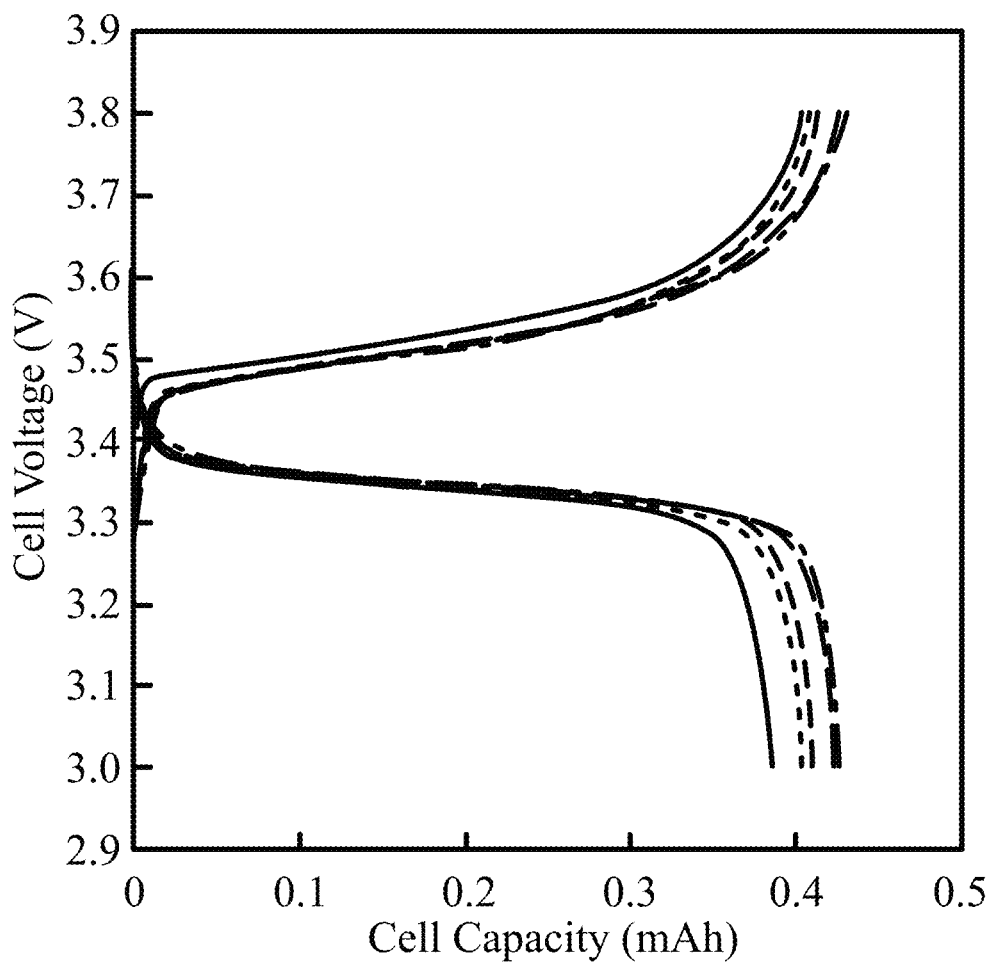
FIG. 11 illustrates voltage profiles of a device, according to some embodiments of the present disclosure.

FIGS. 10 and 11 display cathode half-cell cycling data collected during galvanostatic cycling. FIG. 10 reflects a low-loading cathode cycling beyond 50 cycles. This exemplary half-cell contained a cathode layer made of a mixture of LFP, CB, and PVDF deposited by electrospraying with the simultaneous electrospinning of electrolyte material of PEO and LiClO$_4$. The half-cell also contained a solid-state electrolyte layer of PEO and LiClO$_4$ deposited by electrospinning. A lithium metal counter electrode was used to complete the cycle testing. The initial three formation cycles were driven at 11 uA/cm$^2$, 11 uA/cm$^2$, and 23 uA/cm$^2$ respectively; heightened cycling rates (how fast a cell is charged and then discharged) accounts for the dramatic variation in discharge capacity from cycle 2 to cycle 3. The long-term cycling began at cycle 4 at 17 uA/cm$^2$. The fluctuation in discharge capacity over long term cycling may be due to active material isolation (for example cycles 41 to 42) and activation (for examples cycles 1 to 2) over the course of repeated lithiation and delithiation. Voltage profiles, for the same cathode as tested for FIG. 10, displayed in FIG. 11, using PEO/LiClO$_4$ electrolyte, reveal the same fluctuation of capacity but maintain a stable voltage plateau from cycle 4 to cycle 50 with minimal overpotential growth. Minor voltage oscillation (on the order of +/−0.05V) resulted from cycling temperature fluctuation within the oven. In summary, this new process resulted in a half-cell that maintained a suitable voltage profile and achieved high coulombic efficiencies (1$^{st}$ cycle: 97.15%, Average: 99.17%). (Legend for FIG. 11: solid line=cycle one—15 µA; short dashed line=cycle two—15 µA; medium dashed line=cycle three—22 µA; long dashed line=cycle four—22 µA; long-short dashed line=cycle five—22 µA.)

Figure 12:
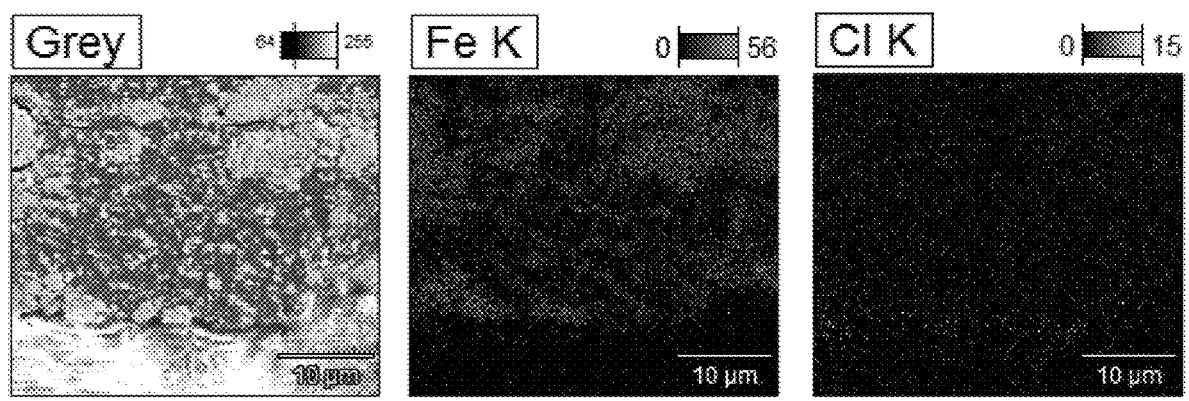
FIG. 12 illustrates SEM and EDX images of an uncycled Sn electrode cross section, according to some embodiments of the present disclosure.
Figure 13:
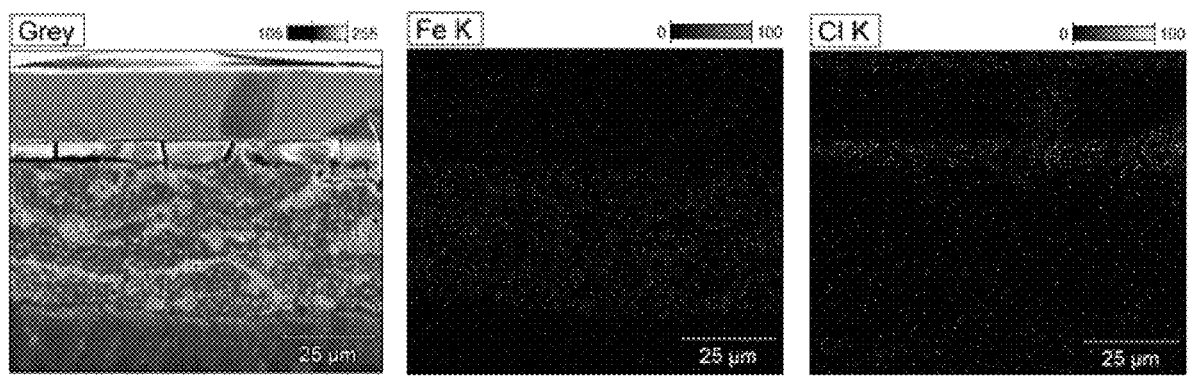
FIG. 13 illustrates SEM and EDX images of a cycled Sn electrode cross section, according to some embodiments of the present disclosure.

FIGS. 12 and 13 illustrate cross sectional images of the exemplary cathode layer described above and in FIGS. 10 and 11, both before and after cycling. The iron EDS spectrum of an uncycled sample is shown in FIG. 12. This image reveals a dense electrode with a large size variation of active material agglomerations throughout the cross section. This variation likely resulted from intermittent particle deposition caused by the inconsistencies of transport of a viscous, particle-laden flow through a narrow deposition nozzle. In addition, a void-free electrolyte-cathode interface was observed, which was enabled by the cold compaction of porous fibers into a dense solid, layer-by-layer. FIG. 13 reveals a void-free electrolyte-electrode interface after 5 cycles.

An exemplary anode electrode electrospraying solution consisted of tin nanoparticles (Sn, Sigma Aldrich), PVDF, and super pitch Timcal carbon black (producer) in a weight ratio of 75:15:10, with a possible range between 50:25:25 and 90:5:5, and mixed in dimethylformamide (DMF, Sigma Aldrich) overnight; the solid electrolyte layer electrospinning solution remained the same as described in the cathode electrode. Using the same methodology, the anode electrode was fabricated. The anode solution material was deposited at a rate of 0.8 grams of solids per hour, and the SSE was deposited on to a copper substrate. Sn was selected due to its mixed conductive properties. Anode half cells were cycled between 0.01V and 1.5 V.

Figure 14:
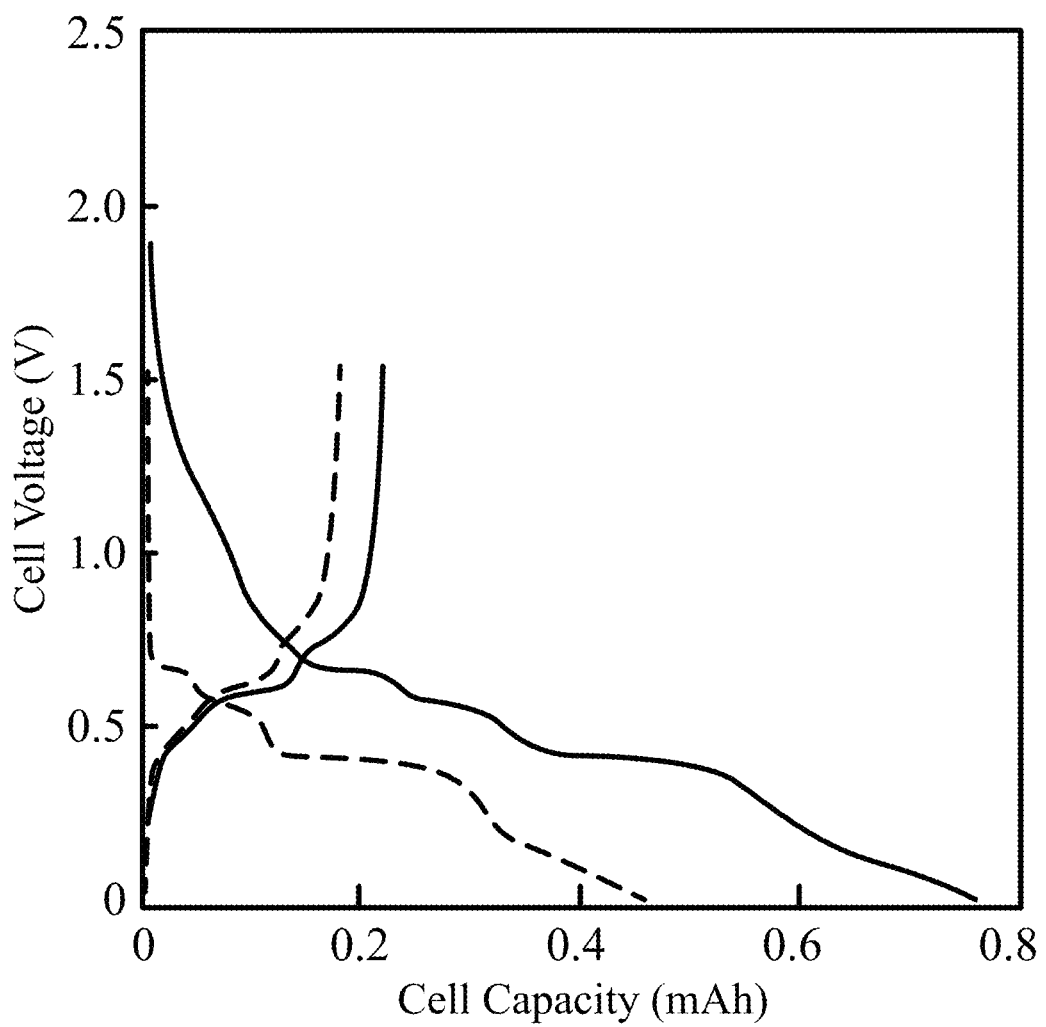
FIG. 14 illustrates a synchronized deposition Sn electrode voltage profile, according to some embodiments of the present disclosure.
Figure 15:
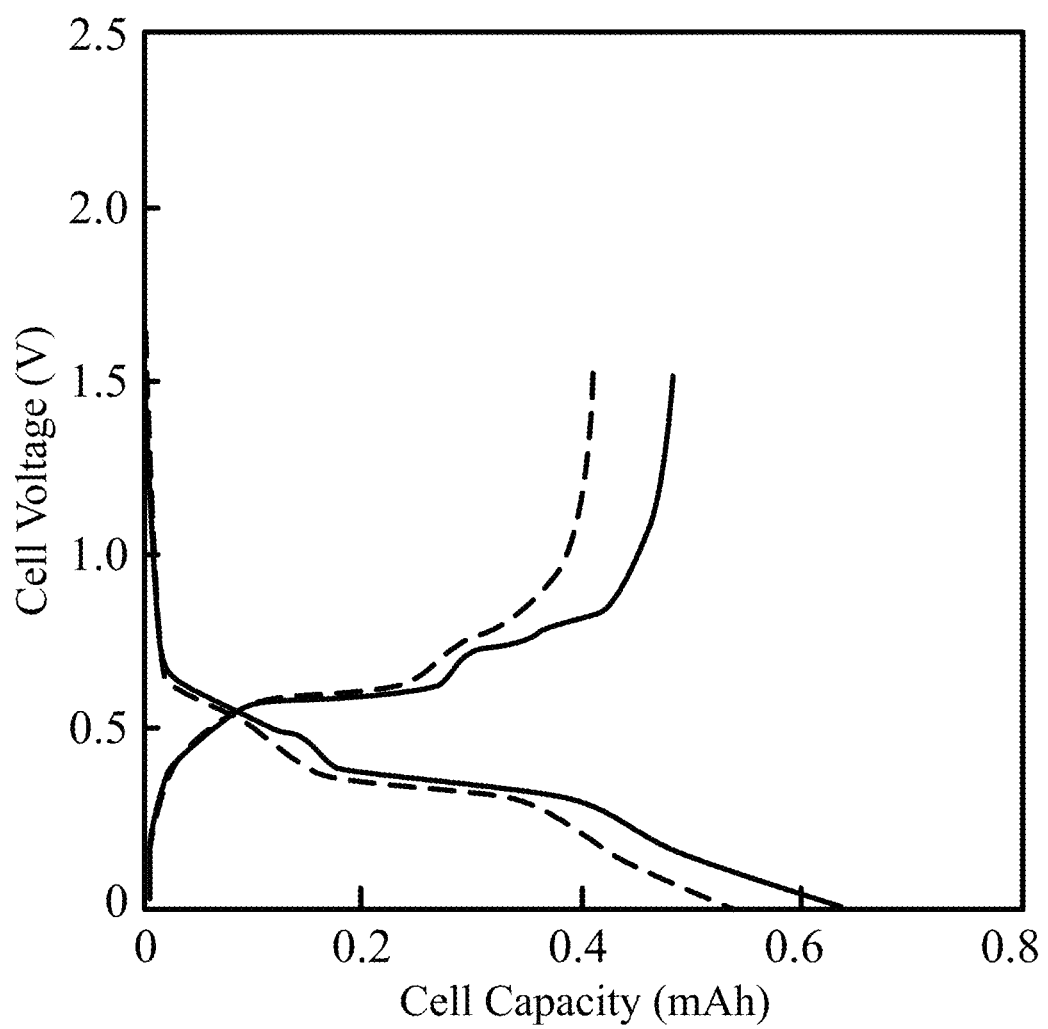
FIG. 15 illustrates a synchronized deposition Sn electrode voltage profile after formation cycle, according to some embodiments of the present disclosure.
Figure 16:
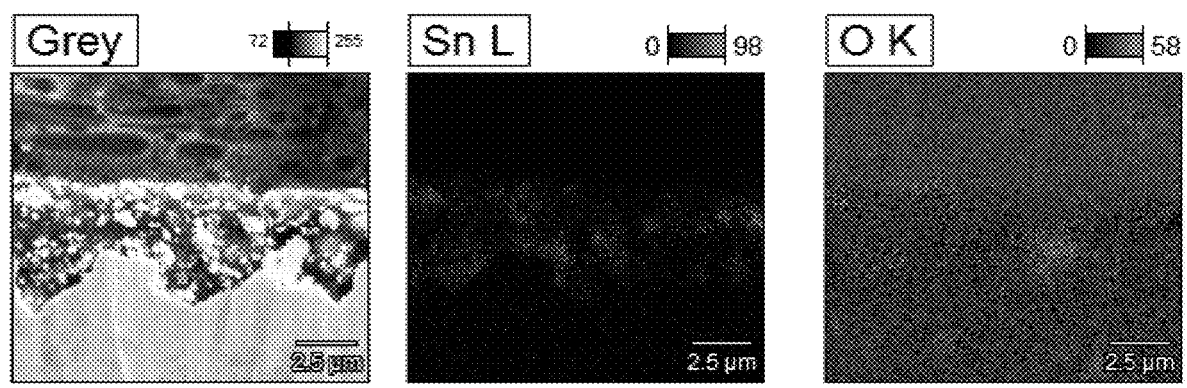
FIG. 16 illustrates SEM and EDX images of an uncycled Sn electrode cross section, according to some embodiments of the present disclosure.
Figure 17:
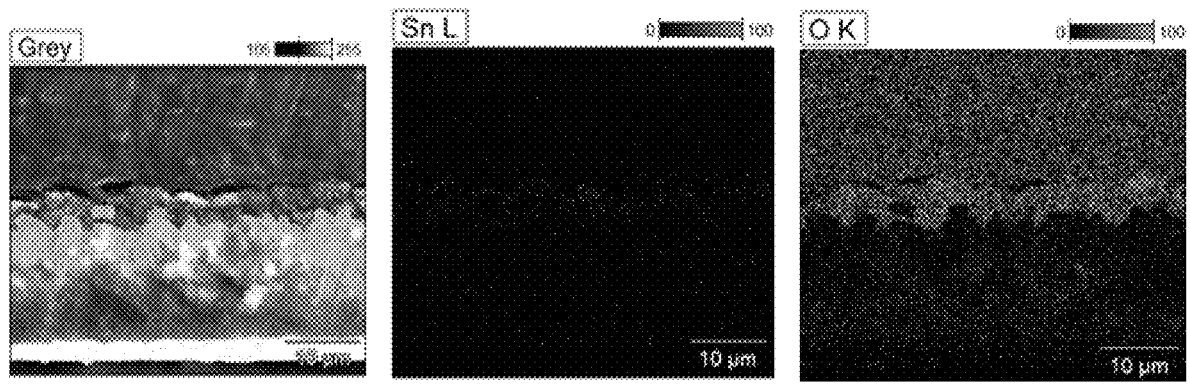
FIG. 17 illustrates SEM and EDX images of a cycled Sn electrode cross section, according to some embodiments of the present disclosure.

FIGS. 14-17 illustrate data for the Sn anode half cell (anode: Sn nanoparticles/CB/PVDF solution deposited by the electrospraying nozzle+PEO/LiClO$_4$ solution deposited electrospinning nozzle; electrolyte: PEO/LiClO$_4$ solution deposited by electrospinning nozzle). FIG. 14 demonstrates large irreversible capacity loss, but the three distinct plateau regions are consistent with Sn alloying (legend: solid line=cycle one—7 µA, dashed line=cycle two—7 µA). FIG. 15 demonstrates increased coulombic efficiencies and heightened cycling performance after an initial cycling formation protocol is performed (legend: solid line=cycle one—7 µA, dashed line=cycle two—7 µA). Enhancement from FIG. 14 to FIG. 15 promises continued performance improvements, especially with the attractive high specific capacity of Sn. Refining chemical composition ratios and improving deposition quality will dramatically improve cycling quality. The cross-section SEM image and EDX spectrum of FIG. 16 shows a dense anode with seamless interfacial continuity revealed by the oxygen spectrum. The anode was cycled for six cycles in a full cell and an anode cross section was taken, as seen in the SEM image of FIG. 17. The SEM images reveal an expanded anode as well as voids along the interface.

Figure 18:
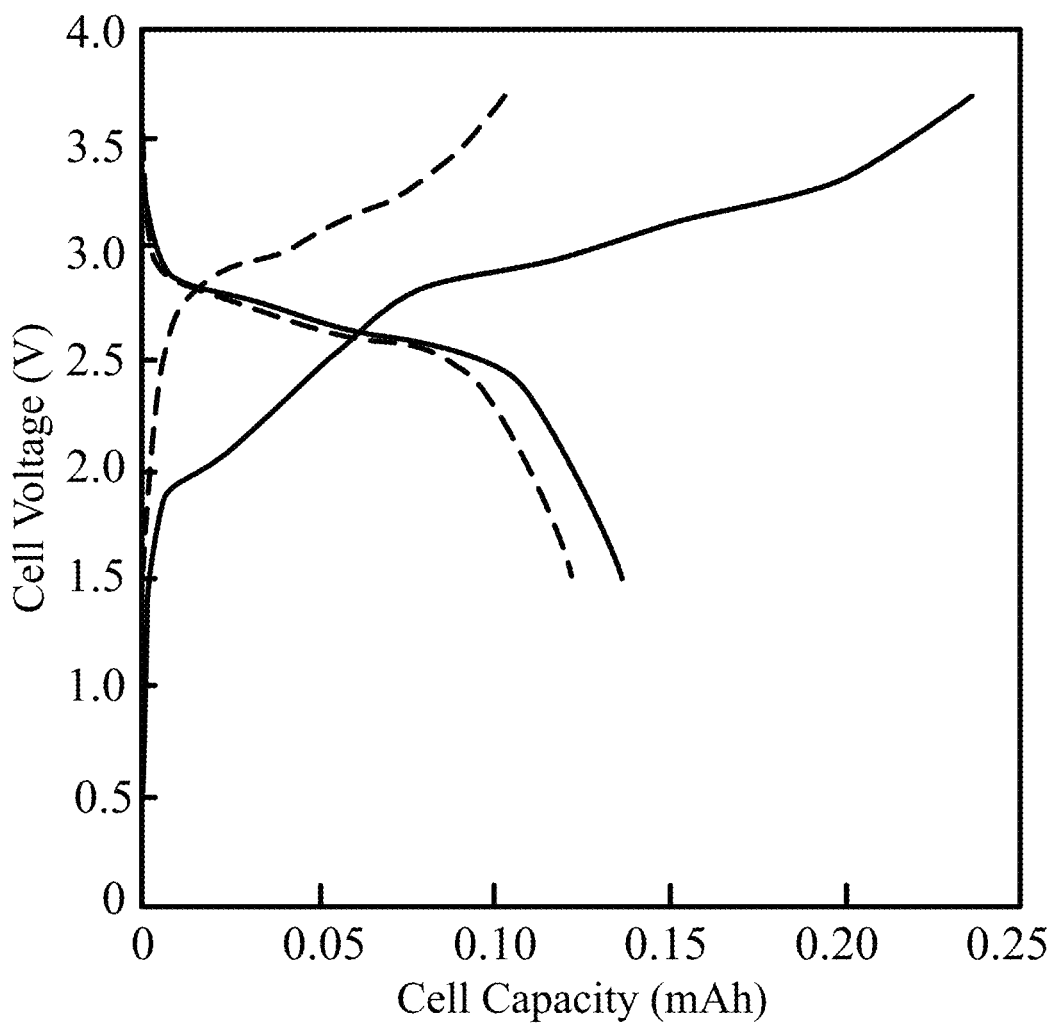
FIG. 18 illustrates a voltage profile of a full cell of independently deposited electrodes, according to some embodiments of the present disclosure.
Figure 19:
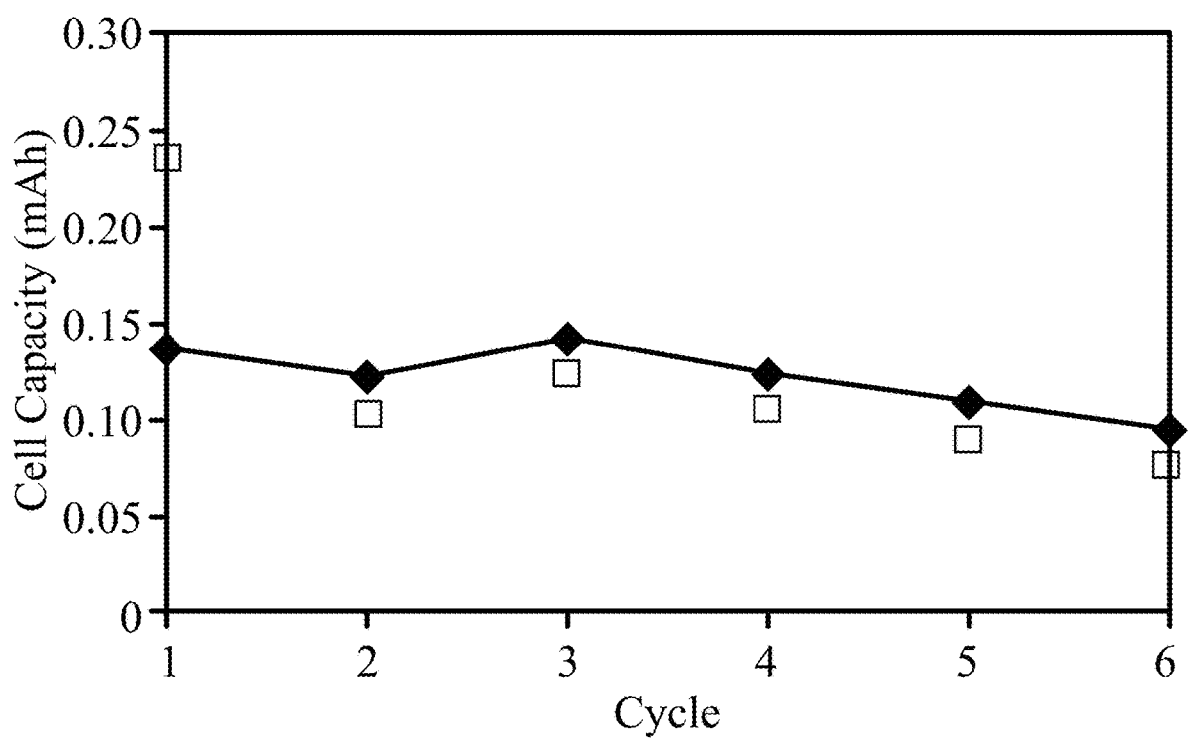
FIG. 19 illustrates the initial full cell cycling of independently deposited electrodes, according to some embodiments of the present disclosure.
Figure 20:
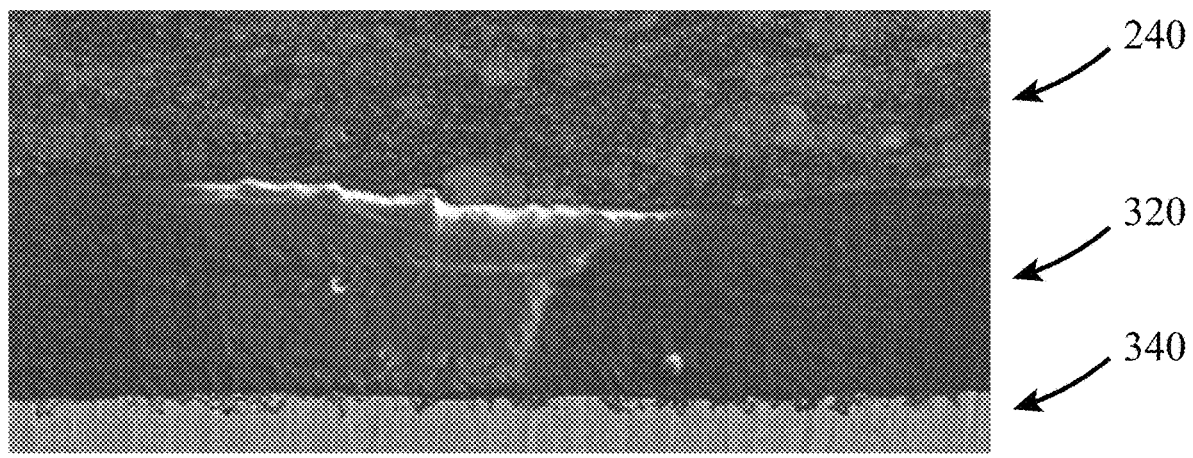
FIG. 20 illustrates an SEM image of an all-solid-state battery made by some of the methods described herein, uncycled full cell cross section, according to some embodiments of the present disclosure.
Figure 21:
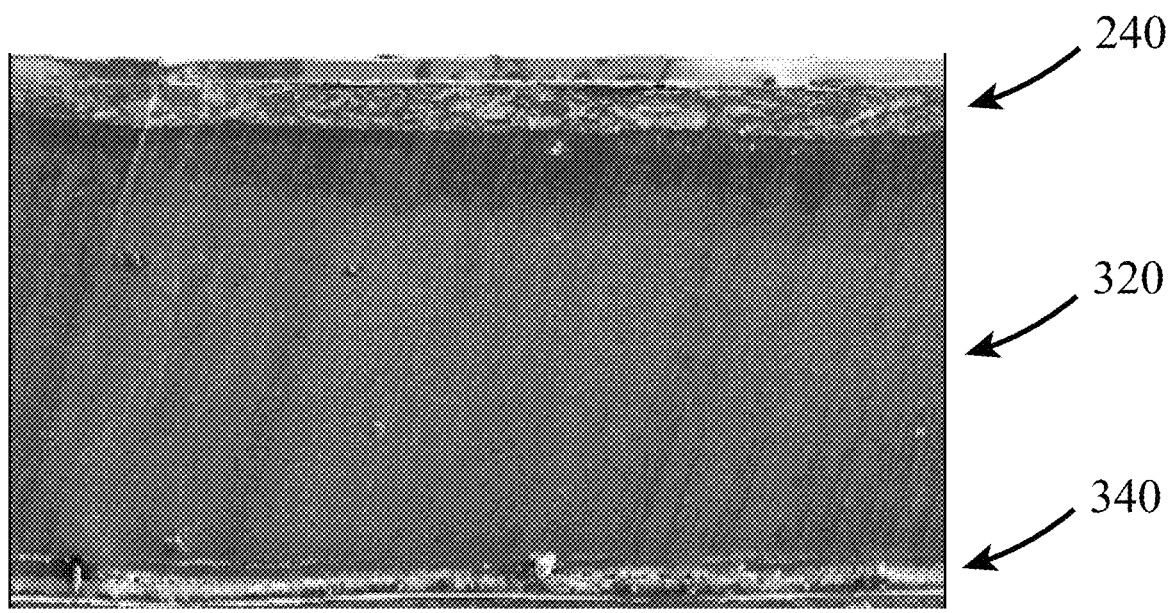
FIG. 21 illustrates an SEM image of an all-solid-state battery made by some of the methods described herein, cycled full cell cross section, according to some embodiments of the present disclosure.

Full cells cycled with the electrospun SSE between the described anode and cathode via cold compression of the independent electrodes and SSE were created, simulating the all-solid-state battery that may be created through by the manufacturing process illustrated in FIG. 3 (cathode: LFP/CB/PVDF [by electrospraying nozzle]+PEO/LiClO$_4$ [by electrospinning nozzle]; anode: Sn nanoparticles/CB/PVDF [by electrospraying nozzle]+PEO/LiClO$_4$ [by electrospinning nozzle]; electrolyte: PEO/LiClO$_4$ [by electrospinning nozzle]). The full cells cycled between 1.5V and 3.7V at 60° C. FIGS. 18-21 exhibit the half-cell voltage profiles for the Sn anode described above. FIG. 18 highlights the first and second cycle voltage profiles, with a first cycle coulombic efficiency of 57.8% (legend: solid line=cycle one—10 µA, dashed line=cycle two—10 µA). FIG. 19 demonstrates full cell reversibility for several cycles, where the square markers represent the charge capacity and the diamond represent the discharge capacity. The greater than 100% coulombic efficiency is likely due to subsequent cycling recovering capacity lost during the first cycle. SEM imaging of the full cell cross section displayed in FIG. 20 reveals no obvious voids between the electrolyte and electrodes or any discontinuities within the electrodes or electrolyte themselves. FIG. 20 clearly shows a first compressed layer 240 (a cathode layer), a second compressed layer 320 (an electrolyte layer), and a third compressed layer 340 (an anode layer). (FIG. 21 highlights cycled full cell cross section, with a much thicker electrolyte layer, i.e. a second compressed layer 320 positioned between the cathode layer (i.e. first compressed layer 240) and the anode layer (i.e. third compressed layer 340).

Examples

Example 1. A system comprising: a first deposition system comprising: a first cylinder having a first outer surface configured to hold a first substrate; a first spray nozzle configured to receive at least a first fluid; and a first fiber nozzle configured to receive at least a second fluid, wherein: the first spray nozzle is configured to operate at a first voltage, the first fiber nozzle is configured to operate at a second voltage, the first cylinder is configured to be electrically connected to ground, the first spray nozzle is configured to apply onto the substrate a first plurality of at least one of particles or droplets from the first fluid, the first fiber nozzle is configured to apply onto the substrate a first fiber from the second fluid, and the first plurality of particles or droplets and the first fiber combine to form a first composite layer on the substrate.

Example 2. The system of Example 1, wherein the first cylinder may rotate at a speed between 0.1 RPM and 100 RPM.

Example 3. The system of Example 1, wherein the first outer surface is operated at a first temperature between 0° C. and 200° C.

Example 4. The system of Example 1, wherein the first cylinder has a circumference between 2 cm and 250 cm.

Example 5. The system of Example 1, wherein the first cylinder has a width between 2 cm and 250 cm.

Example 6. The system of Example 1, wherein the first spray nozzle comprises a first tip having an inside diameter between 0.05 mm and 3.0 mm.

Example 7. The system of Example 1, wherein the first fluid comprises a cathode active material or an anode active material.

Example 8. The system of Example 7, wherein the cathode active material comprises at least one of a lithium metal oxide, a lithium iron phosphate, or a vanadium oxide.

Example 9. The system of Example 8, wherein the lithium metal oxide comprises $LiMO_2$ where M comprises a transition metal.

Example 10. The system of Example 9, wherein the transition metal comprises at least one of nickel, manganese, cobalt, or aluminum.

Example 11. The system of Example 8, wherein the lithium metal oxide comprises lithium titanium oxide.

Example 12. The system of Example 7, wherein the anode active material comprises at least one of graphite or an intermetallic alloy.

Example 13. The system of Example 7, wherein the first fluid further comprises a first solvent.

Example 14. The system of Example 1, wherein the first spray nozzle comprises a second tip having an inside diameter between 0.05 mm and 3.0 mm.

Example 15. The system of Example 1, wherein the second fluid comprises a polymer and a salt.

Example 16. The system of Example 15, wherein the polymer comprises at least one of poly(ethylene oxide), polyacrylonitrile, poly(vinylidene fluoride), or poly(methyl methacrylate).

Example 17. The system of Example 15, wherein the salt comprises at least one of $LiClO_4$, LiTFSI, or LiFSI.

Example 18. The system of Example 15, wherein the second fluid further comprises a first solvent.

Example 19. The system of Example 1, wherein the first voltage is between one kV and 100 kV.

Example 20. The system of Example 19, wherein the first voltage is between 10 kV and 20 kV.

Example 21. The system of Example 1, wherein the second voltage is between one kV and 100 kV.

Example 22. The system of Example 21, wherein the second voltage is between 10 kV and 20 kV.

Example 23. The system of Example 1, wherein the substrate comprises an electrically conductive material.

Example 24. The system of Example 1, wherein: the first deposition system further comprises a first compression system configured to transform the first composite layer having a first solid density to a second composite layer having a second solid density, and the second solid density is greater than the first solid density.

Example 25. The system of Example 24, wherein: the first compression system comprises a first roller positioned adjacent to a second roller, the first roller has a second outer surface, the second roller has a third outer surface, the second outer surface and the third outer surface are positioned substantially parallel to each other, the second outer surface and the third outer surface are separated by a first gap, and the first composite layer is configured to pass through the first gap.

Example 26. The system of Example 25, wherein the first gap is between 1 μm and about 500 μm.

Example 27. The system of Example 1, wherein the second solid density is between about 1.0 g/ml and about 2.5 g/ml.

Example 28. The system of Example 1, wherein the first fiber and the first plurality of at least one of particles or droplets are uniformly mixed on the substrate.

Example 29. The system of Example 1, further comprising: a second deposition system comprising: a second cylinder having a fourth outer surface configured to receive the second composite layer; and a second fiber nozzle configured to receive at least a third fluid, wherein: the second fiber nozzle is configured to operate at a third voltage, the second cylinder is configured to be electrically connected to ground, the second fiber nozzle is configured to apply onto the second composite layer a second fiber from the third fluid, and the second fiber forms a third composite layer on the second composite layer.

Example 30. The system of Example 29, wherein the second cylinder may rotate at a speed between 0.1 RPM and 100 RPM.

Example 31. The system of Example 29, wherein the fourth outer surface is operated at a second temperature between 0° C. and 200° C.

Example 32. The system of Example 29, wherein the second cylinder has a circumference between 2 cm and 250 cm.

Example 33. The system of Example 29, wherein the second cylinder has a width between 2 cm and 250 cm.

Example 34. The system of Example 29, wherein the second fiber nozzle comprises a third tip having an inside diameter between 0.05 mm and 3.0 mm.

Example 35. The system of Example 29, wherein the third fluid comprises a polymer and a salt.

Example 36. The system of Example 35, wherein the polymer comprises at least one of poly(ethylene oxide), polyacrylonitrile, poly(vinylidene fluoride), or poly(methyl methacrylate).

Example 37. The system of Example 35, wherein the salt comprises at least one of $LiClO_4$, LiTF SI, or LiFSI.

Example 38. The system of Example 29, wherein the third fluid further comprises a third solvent.

Example 39. The system of Example 29, wherein the third voltage is between one kV and 100 kV.

Example 40. The system of Example 39, wherein the third voltage is between 10 kV and 20 kV.

Example 41. The system of Example 29, wherein: the second deposition system further comprises a second compression system configured to transform the third composite layer having a third solid density to a fourth composite layer having a fourth solid density, and the fourth solid density is greater than the third solid density.

Example 42. The system of Example 41, wherein: the second compression system comprises a third roller positioned adjacent to a fourth roller, the third roller has a fifth outer surface, the fourth roller has a sixth outer surface, the fifth outer surface and the sixth outer surface are positioned substantially parallel to each other, the fifth outer surface and the sixth outer surface are separated by a second gap, and the third composite layer is configured to pass through the second gap.

Example 43. The system of Example 42, wherein the second gap is between 1 μm and about 500 μm.

Example 44. The system of Example 41, wherein the fourth solid density is between about 1.0 g/ml and about 2.5 g/ml.

Example 45. The system of Example 29, further comprising: a third deposition system comprising: a third cylinder having a seventh outer surface configured to receive the fourth composite layer; a second spray nozzle configured to receive at least a fourth fluid; and a third fiber nozzle configured to receive at least a fifth fluid, wherein: the second spray nozzle is configured to operate at a fourth voltage, the third fiber nozzle is configured to operate at a fifth voltage, the third cylinder is configured to be electrically connected to ground, the second spray nozzle is configured to apply onto the fourth composite layer a second plurality of at least one of particles or droplets from the fourth fluid, the third fiber nozzle is configured to apply onto the fourth composite layer a second fiber from the fifth fluid, and the second plurality of particles or droplets and the third fiber combine to form a fifth composite layer on the fourth composite layer.

Example 46. The system of Example 45, wherein the third cylinder may rotate at a speed between 0.1 RPM and 100 RPM.

Example 47. The system of Example 45, wherein the seventh outer surface is operated at a third temperature between 0° C. and 200° C.

Example 48. The system of Example 45, wherein the third cylinder has a circumference between 2 cm and 250 cm.

Example 49. The system of Example 45, wherein the third cylinder has a width between 2 cm and 250 cm.

Example 50. The system of Example 45, wherein the second spray nozzle comprises a fourth tip having an inside diameter between 0.05 mm and 3.0 mm.

Example 51. The system of Example 45, wherein the fourth fluid comprises a cathode active material or an anode active material.

Example 52. The system of Example 51, wherein the cathode active material comprises at least one of a lithium metal oxide, a lithium iron phosphate, or a vanadium oxide.

Example 53. The system of Example 52, wherein the lithium metal oxide comprises $LiMO_2$ where M comprises a transition metal.

Example 54. The system of Example 53, wherein the transition metal comprises at least one of nickel, manganese, cobalt, or aluminum.

Example 55. The system of Example 52, wherein the lithium metal oxide comprises lithium titanium oxide.

Example 56. The system of Example 51, wherein the anode active material comprises at least one of graphite or an intermetallic alloy.

Example 57. The system of Example 45, wherein the fourth fluid further comprises a fourth solvent.

Example 58. The system of Example 45, wherein the third fiber nozzle comprises a fifth tip having an inside diameter between 0.05 mm and 3.0 mm.

Example 59. The system of Example 45, wherein the fifth fluid comprises a polymer and a salt.

Example 60. The system of Example 59, wherein the polymer comprises at least one of poly(ethylene oxide), polyacrylonitrile, poly(vinylidene fluoride), or poly(methyl methacrylate).

Example 61. The system of Example 59, wherein the salt comprises at least one of $LiClO_4$, LiTFSI, or LiFSI.

Example 62. The system of Example 45, wherein the fifth fluid further comprises a fifth solvent.

Example 63. The system of Example 45, wherein the fourth voltage is between one kV and 100 kV.

Example 64. The system of Example 63, wherein the fourth voltage is between 10 kV and 20 kV.

Example 65. The system of Example 45, wherein the fifth voltage is between one kV and 100 kV.

Example 66. The system of Example 65, wherein the fifth voltage is between 10 kV and 20 kV.

Example 67. The system of Example 45, wherein: the third deposition system further comprises a third compression system configured to transform the fifth composite layer having a fifth solid density to a sixth composite layer having a sixth solid density, and the sixth solid density is greater than the fifth solid density.

Example 68. The system of Example 67, wherein: the third compression system comprises a fifth roller positioned adjacent to a sixth roller, the fifth roller has an eighth outer surface, the sixth roller has a ninth outer surface, the eighth outer surface and the ninth outer surface are positioned substantially parallel to each other, the eighth outer surface and the ninth outer surface are separated by a third gap, and the fifth composite layer is configured to pass through the third gap.

Example 69. The system of Example 68, wherein the third gap is between 1 μm and about 500 μm.

Example 70. The system of Example 1, wherein the sixth solid density is between about 1.0 g/ml and about 2.5 g/ml.

Example 71. The system of Example 45, wherein the third fiber and the second plurality of at least one of particles or droplets are uniformly mixed.

Example 72. A solid-state battery comprising, in order: a solid cathode layer; a solid electrolyte layer; and a solid anode layer, wherein: the solid cathode layer comprises a first active material, a first polymer, and a first salt, the solid electrolyte layer comprises a second polymer and a second salt, the solid anode layer comprises a second active material, a third polymer, and a third salt, the first active material, the first polymer, and the first salt are uniformly mixed, the second active material, the third polymer, and the third salt are uniformly mixed, and each layer has a solid density between 1.0 g/ml and about 2.5 g/ml.

Example 73. The solid-state battery of Example 72, wherein the first active material comprises at least one of a lithium metal oxide, a lithium iron phosphate, or a vanadium oxide.

Example 74. The solid-state battery of Example 73, wherein the lithium metal oxide comprises $LiMO_2$ where M comprises a transition metal.

Example 75. The solid-state battery of Example 74, wherein the transition metal comprises at least one of nickel, manganese, cobalt, or aluminum.

Example 76. The solid-state battery of Example 74, wherein the lithium metal oxide comprises lithium titanium oxide.

Example 77. The solid-state battery of Example 72, wherein the second active material comprises at least one of graphite or an intermetallic alloy.

Example 78. The solid-state battery of Example 72, wherein the first polymer comprises at least one of poly(ethylene oxide), polyacrylonitrile, poly(vinylidene fluoride), or poly(methyl methacrylate).

Example 79. The solid-state battery of Example 72, wherein the first salt comprises at least one of $LiClO_4$, LiTFSI, or LiFSI.

Example 80. The solid-state battery of Example 72, wherein the second polymer comprises at least one of poly(ethylene oxide), polyacrylonitrile, poly(vinylidene fluoride), or poly(methyl methacrylate).

Example 81. The solid-state battery of Example 72, wherein the second salt comprises at least one of $LiClO_4$, LiTFSI, or LiFSI.

Example 82. The solid-state battery of Example 72, wherein the third polymer comprises at least one of poly(ethylene oxide), polyacrylonitrile, poly(vinylidene fluoride), or poly(methyl methacrylate).

Example 83. The solid-state battery of Example 72, wherein the third salt comprises at least one of $LiClO_4$, LiTFSI, or LiFSI.

Example 84. The solid-state battery of Example 72, wherein the solid cathode layer has a thickness between 1 µm and about 500 µm.

Example 85. The solid-state battery of Example 72, wherein the solid electrolyte layer has a thickness between 1 µm and about 500 µm.

Example 86. The solid-state battery of Example 72, wherein the solid anode layer has a thickness between 1 µm and about 500 µm.

Example 87. The solid-state battery of Example 72, further comprising an energy density greater than 300 Wh/kg.

Example 88. The solid-state battery of Example 87, wherein the energy density is between 300 Wh/kg and 400 Wh/kg.

Example 89. The solid-state battery of Example 78, further comprising a total interfacial resistance of less than 100 ohm/cm$^2$.

Example 90. The solid-state battery of Example 72, further comprising: a first metal layer, wherein: the solid cathode layer is positioned between the first metal layer and the solid electrolyte layer.

Example 91. The solid-state battery of Example 90, further comprising: a second metal layer, wherein: the solid anode layer is positioned between the second metal layer and the solid electrolyte layer.

Example 92. A method of making a solid-state battery, the method comprising: a first depositing of a solid cathode layer onto a substrate, wherein: the first depositing comprises: a first electrospraying of a cathode active material onto the substrate; and a first electrospinning of a first electrolyte material onto the substrate, wherein: the first electrospraying and the first electrospinning result in the combining of the cathode material and the first electrolyte material to form the solid cathode layer having a first density.

Example 93. The method of Example 92, further comprising: a first compressing of the solid cathode layer, wherein: the first compressing results in a compressed solid cathode layer having a second density that is greater than the first density.

Example 94. The method of Example 93, further comprising: a second depositing of a solid electrolyte layer having a third density onto the compressed solid cathode layer, wherein: the second depositing comprises a second electrospinning of a second electrolyte material onto the compressed solid cathode layer.

Example 95. The method of Example 94, further comprising: a second compressing of the solid electrolyte layer, wherein: the second compressing results in a compressed solid electrolyte layer having a fourth density that is greater than the third density.

Example 96. The method of Example 95, further comprising: a third depositing of a solid anode layer onto the compressed solid electrolyte layer, wherein: the third depositing comprises: a second electrospraying of an anode active material onto the compressed solid electrolyte layer; and a third electrospinning of a third electrolyte material onto the compressed solid electrolyte layer, wherein: the second electrospraying and the third electrospinning result in the combining of the anode material and the third electrolyte material to form the solid anode layer having a fifth density.

Example 97. The method of Example 96, further comprising: a third compressing of the solid anode layer, wherein: the third compressing results in a compressed solid anode layer having a sixth density that is greater than the fifth density.

Example 98. The method of Example 92, wherein the cathode active material comprises at least one of a lithium metal oxide, a lithium iron phosphate, or a vanadium oxide.

Example 99. The method of Example 98, wherein the lithium metal oxide comprises $LiMO_2$ where M comprises a transition metal.

Example 100. The method of Example 99, wherein the transition metal comprises at least one of nickel, manganese, cobalt, or aluminum.

Example 101. The method of Example 98, wherein the lithium metal oxide comprises lithium titanium oxide.

Example 102. The method of Example 92, wherein the first electrolyte material comprises a first polymer and a first salt.

Example 103. The method of Example 102, wherein the first polymer comprises at least one of poly(ethylene oxide), polyacrylonitrile, poly(vinylidene fluoride), or poly(methyl methacrylate).

Example 104. The method of Example 102, wherein the first salt comprises at least one of $LiClO_4$, LiTFSI, or LiFSI.

Example 105. The method of Example 93, wherein the compressed solid cathode layer has a thickness between 1 micron and 5 microns.

Example 106. The method of Example 94, wherein the second electrolyte material comprises a second polymer and a second salt.

Example 107. The method of Example 106, wherein the second polymer comprises at least one of poly(ethylene oxide), polyacrylonitrile, poly(vinylidene fluoride), or poly(methyl methacrylate).

Example 108. The method of Example 106, wherein the second salt comprises at least one of $LiClO_4$, LiTFSI, or LiFSI.

Example 109. The method of Example 95, wherein the compressed solid electrolyte layer has a thickness between 1 micron and 5 microns.

Example 110. The method of Example 96, wherein the anode active material comprises at least one of graphite or an intermetallic alloy.

Example 111. The method of Example 96, wherein the third electrolyte material comprises a third polymer and a third salt.

Example 112. The method of Example 111, wherein the third polymer comprises at least one of poly(ethylene oxide), polyacrylonitrile, poly(vinylidene fluoride), or poly(methyl methacrylate).

Example 113. The method of Example 112, wherein the third salt comprises at least one of $LiClO_4$, LiTFSI, or LiFSI.

Example 114. The method of Example 97, wherein the compressed solid anode layer has a thickness between 1 micron and 5 microns.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A roll-to-roll system for manufacturing a solid-state battery, the system comprising:
    a first deposition system configured to deposit a first composite electrode layer onto a substrate, the first deposition system comprising:
        a first cylinder configured to receive the substrate;
        a first spray nozzle configured to receive a first fluid comprising a first electrode active material; and
        a first fiber nozzle configured to receive a second fluid comprising a first polymer and a first salt, wherein:
        the first spray nozzle is configured to transform the first fluid into at least one of a first plurality of particles or a first plurality of droplets,
        the first fiber nozzle is configured to transform the second fluid into a first fiber,
        the first spray nozzle is configured to direct the at least one of the first plurality of particles or the first plurality of droplets towards the first cylinder and a first fixed location in space,
        the first fiber nozzle is configured to direct the first fiber towards the first cylinder and the first fixed location in space, and
        the first spray nozzle and the first fiber nozzle are configured such that the at least one of the first plurality of particles or the first plurality of droplets and the first fiber combine on the substrate in the first fixed location in space to form the first composite electrode layer;
    a second deposition system configured to deposit a solid electrolyte layer onto the first composite electrode layer; and
    a third deposition system configured to deposit a second composite electrode layer onto the solid electrolyte layer.

2. The system of claim 1, wherein the first spray nozzle comprises a first tip having an inside diameter between 0.05 mm and 3.0 mm.

3. The system of claim 1, wherein the first fluid comprises a cathode active material.

4. The system of claim 1, wherein the first fiber nozzle comprises a second tip having an inside diameter between 0.05 mm and 3.0 mm.

5. The system of claim 1, wherein the first polymer comprises at least one of poly(ethylene oxide), polyacrylonitrile, poly(vinylidene fluoride), or poly(methyl methacrylate).

6. The system of claim 1, wherein the first salt comprises at least one of $LiClO_4$, LiTFSI, or LiFSI.

7. The system of claim 1, wherein the substrate comprises an electrically conductive material.

8. The system of claim 1, wherein:
    the first deposition system further comprises a compression system positioned downstream of the first deposition system and configured to transform the first composite electrode layer having a first solid density to a second composite layer having a second solid density, and
    the second solid density is greater than the first solid density.

9. The system of claim 8, wherein:
    the first compression system comprises:
    a first roller positioned adjacent to a second roller;
    the first roller has a first outer surface,
    the second roller has a second outer surface,
    the first outer surface and the second outer surface are positioned substantially parallel to each other,
    the first outer surface and the second outer surface are separated by a gap, and
    the substrate and first composite electrode layer are configured to pass through the first gap.

10. The system of claim 9, wherein the gap is between 1 µm and about 500 µm.

11. The system of claim 1, wherein:
    the second deposition system comprises:
        a second cylinder configured to receive the substrate with the first composite electrode layer deposited thereon; and
        a second fiber nozzle configured to receive a third fluid comprising a second polymer and a second salt, wherein:
        the second fiber nozzle is configured to transform the third fluid into a second fiber, and
        the second fiber nozzle is configured to direct the second fiber towards the second cylinder such that the second fiber forms the solid electrolyte layer on the first composite electrode layer.

12. The system of claim 11, wherein:
    the third deposition system comprises:
        a third cylinder configured to receive the substrate with the first composite electrode layer and the solid electrolyte layer deposited thereon;
        a second spray nozzle configured to receive a fourth fluid comprising a second electrode active material; and
        a third fiber nozzle configured to receive a fifth fluid comprising a third polymer and a third salt, wherein:
        the second spray nozzle is configured to transform the fourth fluid into at least one of a second plurality of particles or a second plurality of droplets,
        the third fiber nozzle is configured to transform the fifth fluid into a third fiber,
        the second spray nozzle is configured to direct the at least one of the second plurality of particles or the second plurality of droplets towards the third cylinder and a second fixed location in space,
        the third fiber nozzle is configured to direct the third fiber towards the third cylinder and the second fixed location in space, and
        the second spray nozzle and the third fiber nozzle are configured such that the at least one of the second plurality of particles or the second plurality of droplets and the third fiber combine on the solid electrolyte layer in the second fixed location in space to form the second composite electrode layer.

13. The system of claim 1, wherein the first cylinder rotates at a speed between 0.1 RPM and 100 RPM.

14. The system of claim 1, wherein the first cylinder has an outer surface operated at a temperature between 0° C. and 200° C.

15. The system of claim 1, wherein the first cylinder has a circumference between 2 cm and 250 cm.

16. The system of claim 1, wherein the first cylinder has a width between 2 cm and 250 cm.

17. The system of claim 1, wherein the first spray nozzle is configured to operate at a first voltage between 1 kV and 100 kV.

18. The system of claim 1, wherein the first fiber nozzle is configured to operate at a second voltage between 1 kV and 100 kV.

* * * * *